US012548402B2

(12) United States Patent
Levin et al.

(10) Patent No.: US 12,548,402 B2
(45) Date of Patent: Feb. 10, 2026

(54) CUSTOMIZATION MARKETPLACE SYSTEM FOR GAMING SYSTEMS

(71) Applicant: IGT, Las Vegas, NV (US)

(72) Inventors: Christopher M. Levin, Reno, NV (US); Dwayne R. Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 247 days.

(21) Appl. No.: 18/341,012

(22) Filed: Jun. 26, 2023

(65) Prior Publication Data

US 2024/0428646 A1 Dec. 26, 2024

(51) Int. Cl.
*G07F 17/32* (2006.01)

(52) U.S. Cl.
CPC ...... *G07F 17/3227* (2013.01); *G07F 17/3211* (2013.01)

(58) Field of Classification Search
None
See application file for complete search history.

(56) References Cited

U.S. PATENT DOCUMENTS 5,758,875 A 6/1998 Giacalone
6,110,041 A 8/2000 Walker et al.
6,293,866 B1 9/2001 Walker et al.
6,350,199 B1 2/2002 Williams et al.
6,939,226 B1 9/2005 Joshi
7,040,987 B2 5/2006 Walker et al.
7,789,748 B2 9/2010 Landrum et al.
7,976,379 B2 7/2011 Baerlocher
8,167,709 B2 5/2012 Muir
8,251,807 B2 8/2012 Lemay et al.
8,491,392 B2 7/2013 Baerlocher
8,851,965 B2 10/2014 Weiss et al.
9,092,930 B2 7/2015 Cuddy et al.
9,613,500 B2 4/2017 Hornik et al.
11,302,141 B2 4/2022 Simons et al.
11,354,973 B2 6/2022 Keilwert et al.
2002/0142825 A1 10/2002 Lark et al.
2004/0219962 A1 11/2004 Vancura
2005/0223219 A1 10/2005 Gatto et al.
2006/0148553 A1 7/2006 Dodge
2007/0032288 A1 2/2007 Nelson et al.
2007/0207855 A1 9/2007 Moody et al.
2008/0045317 A1 2/2008 Seelig et al.
2008/0070666 A1 3/2008 Gatto et al.
2008/0096650 A1 4/2008 Baerlocher
2008/0113716 A1 5/2008 Beadell et al.
2009/0117989 A1 5/2009 Arezina et al.
2009/0124332 A1 5/2009 Baerlocher
2010/0041470 A1 2/2010 Preisach
2010/0056252 A1* 3/2010 Englman ............. G07F 17/3244 463/20
2010/0130276 A1 5/2010 Fiden et al.
2010/0227684 A1 9/2010 Walker et al.
2011/0312410 A1* 12/2011 Aoki .................. G07F 17/3225 463/25
2014/0256413 A1 9/2014 Arezina et al.
(Continued)

*Primary Examiner* — Ronald Laneau
(74) *Attorney, Agent, or Firm* — Neal, Gerber & Eisenberg LLP

(57) ABSTRACT

Customization systems for gaming systems including customization marketplace systems configured to enable created customizations to be distributed.

20 Claims, 18 Drawing Sheets

(56) References Cited

U.S. PATENT DOCUMENTS

| | | | | |
|---|---|---|---|---|
| 2015/0087369 | A1 | 3/2015 | Mcintyre et al. | |
| 2017/0076538 | A1 | 3/2017 | Nicely et al. | |
| 2018/0286177 | A1 | 10/2018 | Bryson et al. | |
| 2020/0242887 | A1 | 7/2020 | Achmueller et al. | |
| 2021/0366239 | A1 | 11/2021 | Hufnagl-abraham | |
| 2023/0326292 | A1* | 10/2023 | Seaton | G07F 17/3244<br>463/13 |
| 2024/0428647 | A1* | 12/2024 | Levin | G07F 17/3227 |

* cited by examiner

700

| Popular Customizations For Game A | | | |
|---|---|---|---|
| NAME | COST | Total Win | Players |
| Kim K's Super Game A | $5.00 | $1,525,678.25 | 5,678 |
| Bob's funny tamale bonuses | $1.00 | $825,878.00 | 8,275 |
| Crazy times!!!! | Free | $625,678.25 | 28,999 |

FIG. 10

CUSTOMIZATION MARKETPLACE SYSTEM FOR GAMING SYSTEMS

CROSS-REFERENCE TO RELATED APPLICATIONS

This application is related to the following commonly owned patent applications: U.S. application Ser. No. 18/341,009 entitled "CUSTOMIZATIONS FOR GAMING SYSTEMS,"; and U.S. application Ser. No. 18/341,016 entitled "USAGE OF CUSTOMIZATIONS AND RELATED CUSTOMIZATION USAGE DATA FOR CONFIGURING GAMING SYSTEMS,".

BACKGROUND

The present disclosure relates to a customization marketplace system for gaming systems.

Gaming machines may provide players awards in plays of primary games. Gaming machines may require a player to make a wager to activate a play of a primary game. The awards may be based on winning symbols or winning symbol combinations and on the amount of the wager. Gaming machines may provide players awards in plays of secondary games.

SUMMARY

In various embodiments, the present disclosure relates to a gaming system customization marketplace system including: a communication system; a processor; and a memory device that stores a plurality of instructions, which when executed by the processor, cause the processor to: receive, from a first system, a customization that is applicable to a wagering game, wherein the wagering game includes a plurality of different sequential presentation states and wherein the customization: includes an additional presentation state configured to be added to the presentation states of the wagering game, does not change any awards resulting from any play of the wagering game, and does not change any probabilities of obtaining any awards from any play of the wagering game; store the customization; cause a display, by a display device, of an indication of the customization; and send the customization to a gaming system that is different than the first system such that the customization can be applied to a play of the wagering game displayed by the gaming system and such that the gaming system can display a play of the wagering game including the presentation states of the wagering game and the additional state of the customization.

In various other embodiments, the present disclosure relates to a gaming system customization marketplace system including: a communication system; a processor; and a memory device that stores a plurality of instructions, which when executed by the processor, cause the processor to: cause a display, by a display device, of indications of different customizations for a wagering game, wherein each of the customizations: includes an additional presentation state configured to be added to presentations states of the wagering game, does not change any awards resulting from any play of the wagering game, and does not change any probabilities of obtaining any awards from any play of the wagering game; receive a request for one of the customizations; and send the requested customization to a gaming system such that the customization can be applied to a play of the wagering game displayed by the gaming system and such that the gaming system can display of the wagering game including the presentation states and the additional state of the customization.

In various other embodiments, the present disclosure relates to a gaming system customization marketplace system including: a communication system; a processor; and a memory device that stores a plurality of instructions, which when executed by the processor, cause the processor to: cause a display, by a display device, for each of a plurality of different wagering games, indications of different customizations associated with the wagering game, wherein for each wagering game each customization associated with the wagering game: includes an additional presentation state configured to be added to presentations states of the wagering game, does not change any awards resulting from any play of the wagering game, and does not change any probabilities of obtaining any awards from any play of the wagering game; receive a request for one of the customizations; and send the requested customization to a gaming system such that the customization can be applied to the wagering game associated with the customization and such that the gaming system can display a play of the wagering game including the presentation states of the wagering and the additional state of the customization.

Additional features and advantages are described in, and will be apparent from, the following Detailed Description and the figures.

BRIEF DESCRIPTION OF THE SEVERAL VIEWS OF THE DRAWINGS

FIG. 10 shows an example interface configured for a customization marketplace system in accordance with one example embodiment of the present disclosure.

DETAILED DESCRIPTION

In various embodiments, the present disclosure relates to customization marketplace systems configured to operate with customization systems and gaming system configuration systems that utilize customizations and customization related data to configure future gaming systems.

In various embodiments, the present disclosure also relates to: (1) customization creation systems configured to enable the creation, use, and transmittal of customizations for gaming systems; (2) customization storage systems configured to receive, store, and transmit created customizations for gaming systems; (3) customization tracking systems configured to track created customizations and customization related data; (4) customization marketplace systems configured to receive and distribute created customizations; and (5) gaming system configuration systems configured to utilize customizations and related customization data for the configuration of one or more existing or future gaming systems.

Figure 1:
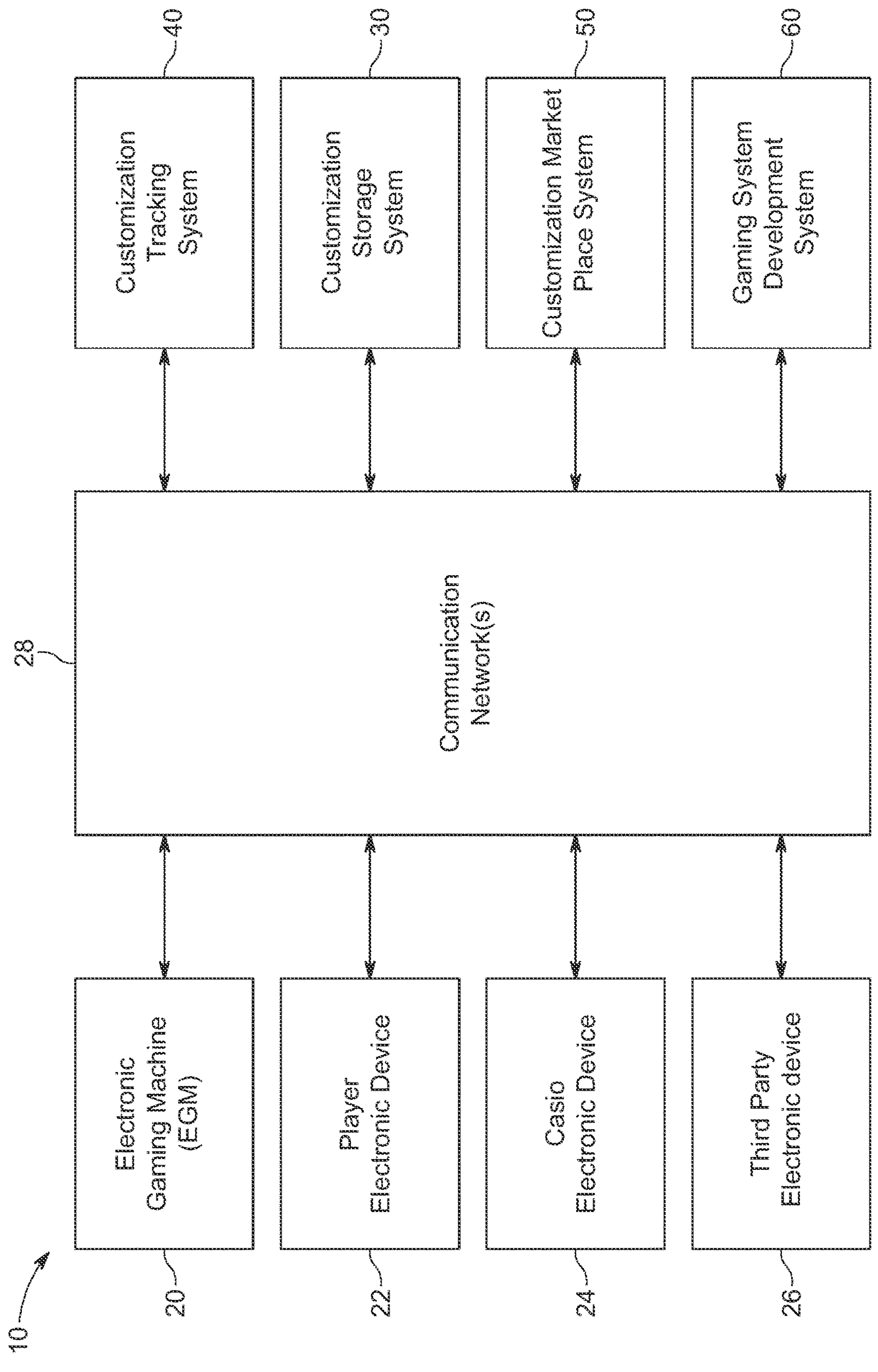
FIG. 1 is a block diagram of an example customization system in accordance with one example embodiment of the present disclosure.

FIG. 1 illustrates an example customization system 10 in accordance with the present disclosure. This example customization system 10 includes one or more customization creation systems in the form of: (a) one or more electronic gaming machines ("EGMs") such as EGM 20; (b) one or more player electronic devices such as player electronic device 22; (c) one or more casino electronic devices such as casino electronic device 24; and/or (b) one or more third party electronic devices such as third electronic device 26. Each of these systems 20, 22, 24, and 26 are configured to: (i) enable a respective player, casino operator, or third party to create one or more customizations for gaming systems such as EGMs as further described below; and (ii) access and use the other components of the customization system 10 such as further described below. It should be appreciated that the term casino is used herein to include any establishment that has one or more gaming systems (such as but not limited to one or more EGMs) playable by players.

This example customization system 10 includes one or more customization storage systems such as customization storage system 30 configured to receive customizations, store the received customizations, and transmit the stored customizations, such as further described below.

The example customization system 10 includes one or more customization tracking systems such as customization tracking system 40 configured to track data regarding the customizations, store the data, and transmit the stored data regarding the customizations, as further described below. The data can include any suitable data regarding the customizations, such as but not limited to the example data described herein.

The example customization system 10 includes one or more customization marketplace systems such as customization marketplace system 50 configured to enable the customizations to be distributed such as, but not limited to, being traded, sold, bought, or otherwise shared, such as but not limited to as further described herein.

The example customization system 10 includes one or more gaming system configuration systems such as gaming system configuration system 60 configured to use one or more customizations and related data for the configuration of one or more existing or future gaming systems, such but not limited to as further described herein.

In various embodiments, the one or more customization creation systems, the one or more customization storage systems, the one or more customization tracking systems, the one or more customization marketplace systems, and the one or more gaming system configuration systems are all separate and independent systems that are each configured to communicate with one or more of the other devices and/or systems of the system 10 via suitable communication systems and networks such as communication networks 28 generally indicated in FIG. 1.

In various other embodiments, two or more of the customization creation systems, the customization storage systems, the customization tracking systems, the customization marketplace systems, and the gaming system configuration systems are combined as and function as one system. For example, in various embodiments, the customization storage system and the customization tracking system are one system. Any suitable combinations of these systems can be utilized in accordance with the present disclosure.

It should thus be appreciated that in various embodiments, the systems and method of the present disclosure: (1) enable a customization entity to use one of the customization creation systems 20, 22, 24, or 26 to create one or more customizations for gaming systems, and then share (such as by selling) such customizations via a customization marketplace system; (2) enable a player to obtain (such as by buying) such customizations via the customization marketplace system; and (3) enable an entity such as a gaming system manufacturer to access such customizations from the customization marketplace system or otherwise to use such customizations to manufacture future gaming systems or reconfigure existing gaming systems.

It should also be appreciated that the customizations can be for EGMs, video lottery terminals ("VLTs"), sport wagering terminals, electronic table games ("ETGs"), social gaming systems (such as slot games played for no money), online gaming systems, and/or mobile gaming systems.

While the customizations for EGMs are used as primary examples herein, such examples are not meant to limit the present disclosure.

Examples of the present disclosure are primarily described herein in relation to customizations for a play of a slot game with reels, but it should be appreciated that the present disclosure can be employed for other game types such as but not limited to card games (such as a poker game or a blackjack game), keno games, bingo games, or other suitable games.

Customization Creation Systems

In various embodiments, the present disclosure relates to systems that function as one or more customization creation systems that enable a customization entity (such as a player, a casino operator, or a third party entity) to create one or more customizations of features for one or more gaming systems such as one or more EGMs. In various embodiments, the gaming systems use each of the customizations to provide one or more displays of one or more plays of one or more games by the gaming systems. While the customization entity can be a player, a casino operator, or a third party, the present disclosure primarily uses a player as the example customization entity for ease of description. Such examples are not meant to limit the present disclosure.

In various embodiments, the customization creations system includes: (1) one or more processors; (2) one or more memory devices; (3) one or more display devices; (4) one or more input devices; and (5) one or more communication systems, that co-act to enable customizations to be created, stored, employed, and transmitted. The customization creation system can create, store, and transmit the customizations as data in any suitable manners and any suitable formats.

In various embodiments, the gaming systems function as the customization creation systems and enable a player to create customizations that customize one or more visual features of a gaming system. In various such embodiments, these customizations can include a change to a visual feature of a game of the gaming system, an addition of a visual feature to a game of the gaming system, or a deletion of a visual feature of a game of the gaming system.

In various embodiments, the gaming systems function as the customization creation systems and enable a player to create customizations that customize one or more audio features of a gaming system. In various such embodiments, these customizations can include a change to an audio feature of a game of the gaming system, an addition of an audio feature to a game of the gaming system, or a deletion of an audio feature of a game of the gaming system.

In various embodiments, the gaming systems function as the customization creation systems and enable a player to create customizations that customize one or more visual features of a gaming system and one or more associated audio features of a gaming system. In various such embodiments, these customizations can include a change to a visual and associated audio feature of a game of the gaming system, an addition of a visual and associated audio feature to a game of the gaming system, or a deletion of a visual and associated audio feature of a game of the gaming system.

In various embodiments, the customization of a game involves enabling the player to change the visual and/or audio aspects of the game including timing and/or order of events in the game (such as the order of spinning and/or stopping of the reels). In various embodiments, the gaming system that functions as the customization creation system enables the player to build a customization that includes a customized presentation for the game that is tailored to one or more of the preferences of the player. In various embodiments, the customization creation systems do not enable the player to create or employ any customization that changes: (1) the eventual outcome of any play of the game; (2) any awards resulting from any play of the game; or (3) any probabilities of obtaining any outcomes or awards from any play of the game.

In various embodiments, the customization creation systems enable a player to create a customization that changes or adds additional presentation states to a game. Thus, it should be appreciated that the player customizations can be simple or complex customizations for a game or gaming system.

In various embodiments, the customization creation systems enable the player customizations to persist from one play of a game to another play of the same game.

In various embodiments, the customization creation systems enable a player to create player customizations that can be employed in different games.

In various embodiments, the customization creation systems enable the player customizations to persist from one gaming system to another gaming system.

In various embodiments, the customization creation systems enable a player to create player customizations that can be employed on different gaming systems for the same player or for different players.

To better understand customizations of the present disclosure, the following background regarding the states of gaming systems is provided.

Figure 2A:
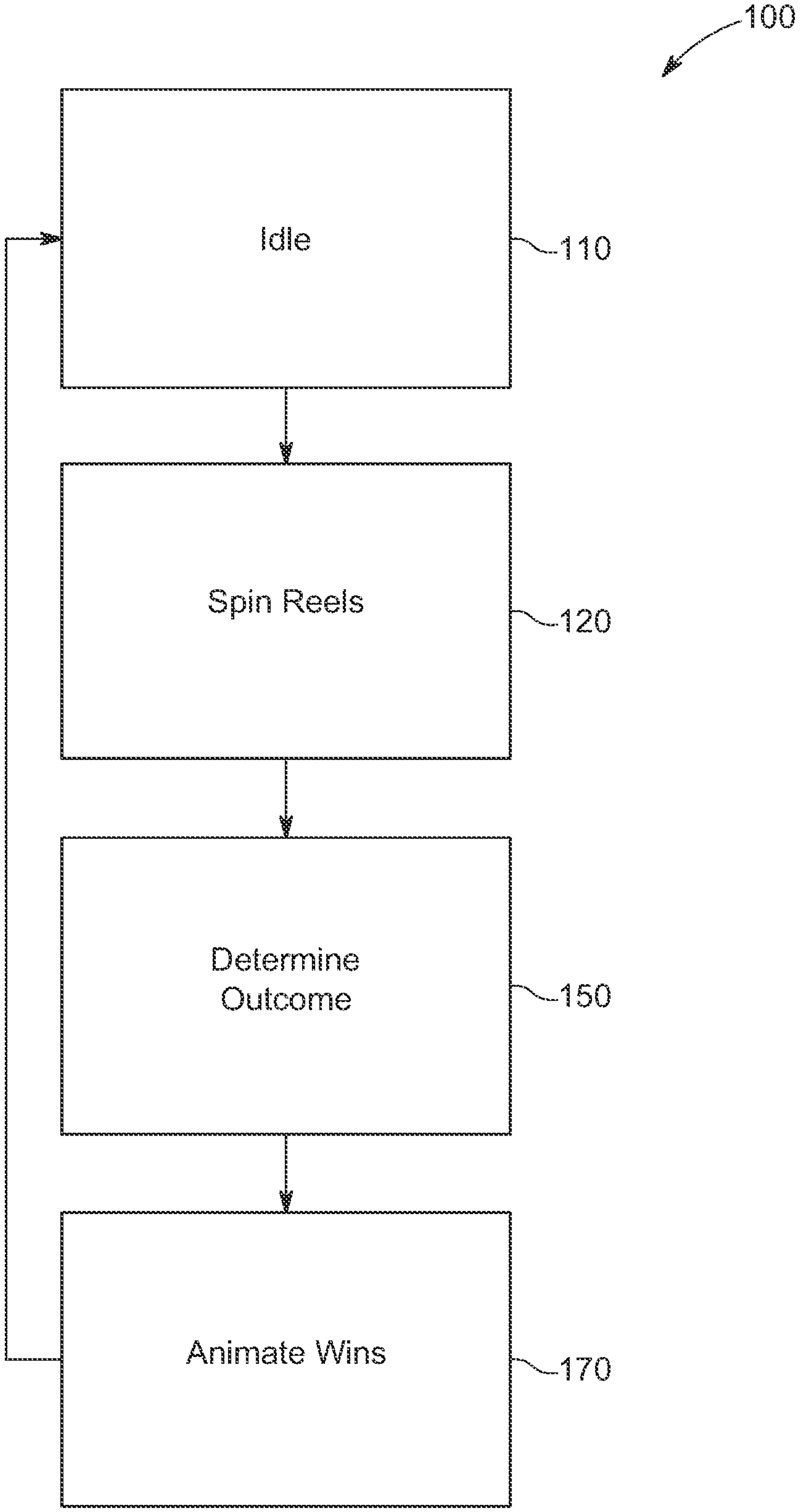
FIG. 2A is a flow chart of presentation states of an example known electronic gaming machine.

When various EGMs provide plays of a slot game, the EGM can be considered to provide logic states for the plays of the slot game and presentation states for the plays of the slot game. The presentation states include the visual and audio states of the slot game before the play of the slot game, as it moves through a play of the slot game, and after the play of the slot game. For example, FIG. 2A illustrates the presentation states 100 for a play of a video slot game of an EGM. The EGM starts at an idle state 110. The EGM then moves from idle state 110 to a spin reels state 120. The EGM then moves from the spin reels state 120 to a determine outcome state 150. The EGM then moves from the determine outcome state 150 to an animate wins state 170. The EGM then moves from the animate wins state 170 back to the idle state 110.

Different specific triggering events cause each change to the respective next state. For example, the EGM: (1) moves from the idle state 110 to the spin reels state 120 after the player places a wager for the play of the game; (2) moves from the spin reels state 120 to the determine outcome state 150 after the reels stop spinning; (3) moves from the determine outcome state 150 to the animate wins state 170 after the EGM determines an outcome on the reels and any awards associated with that outcome for the play of the game; and (4) moves from the animate wins state 170 back to the idle state 110 after the EGM displays any determined player awards and adds any such awards to the player credit meter of the EGM.

Figure 2B:
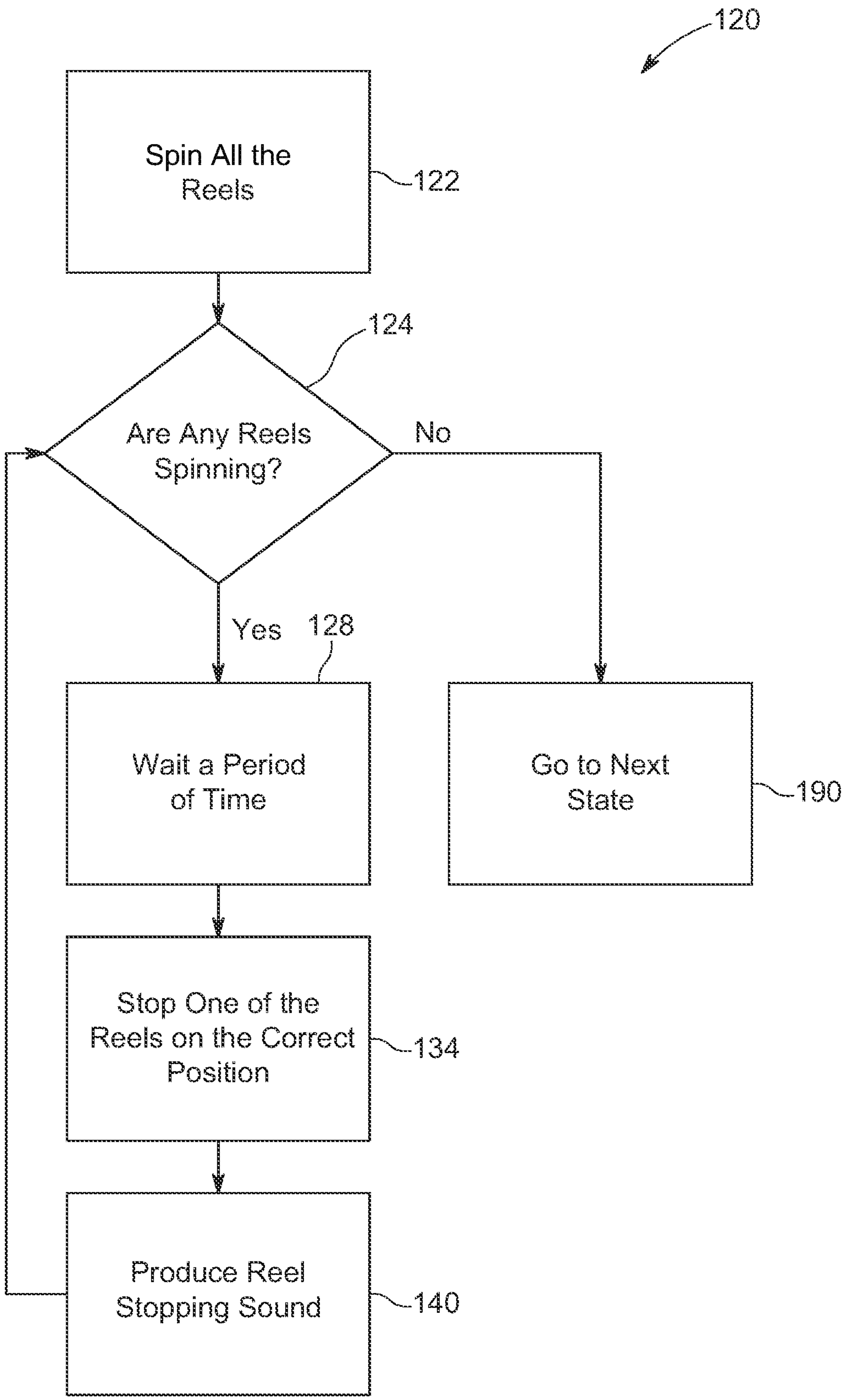
FIG. 2B is a flow chart of the sub-states of a spin reel state of an example slot game of the known electronic gaming machine of FIG. 2A.

One or more or each of the states can additionally have two or more sub-states. For example, the spin reels state 120 can have the example sub-states shown in FIG. 2B. Specifically, the spin reels state 120 includes: (1) a spin all the reels sub-state 122; (2) a wait a period of time sub-state 128; (3) a stop one of the reels on the correct position sub-state 134; and (4) a produce reel stopping sound sub-state 140. Additionally, the sub-states 128, 134, and 140 are repeated for each of the reels of the EGM as indicated by diamond 124. After all of the reels are stopped, the EGM moves to the next state as indicated by block 190.

Thus, the visual and audio presentation of a play of a game by an EGM can in part be described by a series of states with triggering events that respectively cause the EGM to move to the respective next state. Respective triggering events can include but are not limited to: (1) one or more player inputs; (2) a completion of a display of a current state; and (3) a certain amount of time expired for a current state. Other suitable triggering events can be employed to cause the EGM to move from one state to the next state.

The present disclosure provides that since each state (including sub-states) can be self-contained and connected by triggering events, one or more additional states (such as one or more audio and/or visual states or sub-states) can be inserted between certain of these existing states or sub-states without having an impact to the overall outcome of the play of the game, any awards resulting from the play of the game, or any probabilities of obtaining any outcomes or awards.

The present disclosure further provides that the insertion of one or more states or sub-states can require the EGM to have one or more of the states or sub-states include a clean-up sub-state in which the EGM cleans up any remaining presentation (such as remaining displays from) that state before starting the next state or the inserted customization (which then functions as that next state). For example, if in a state the EGM displays a picture, then when that state is done, the EGM can hide or remove that displayed picture as part of the completion of that state.

Figure 3:
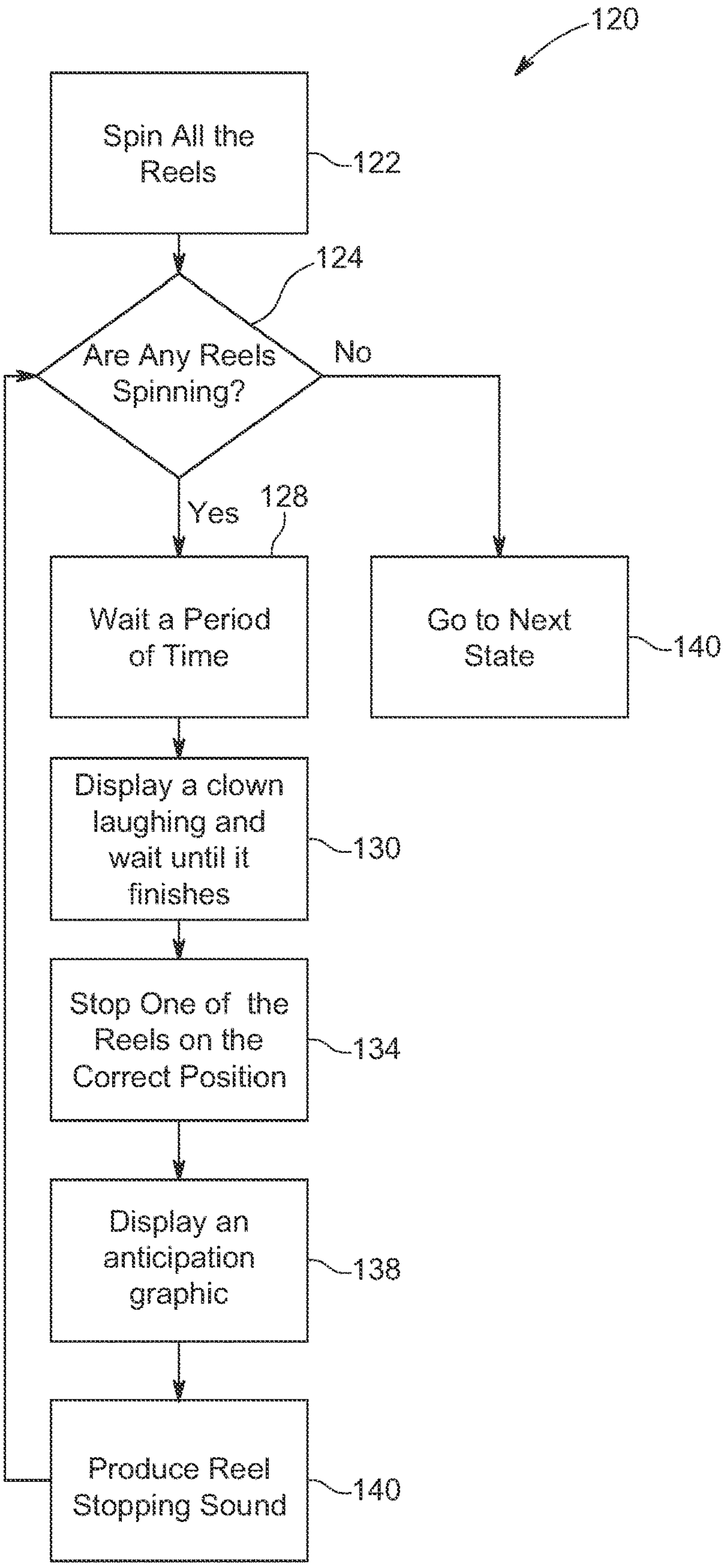
FIG. 3 is a flow chart of the sub-states of a spin reel state that includes two example customizations added to a slot game of an electronic gaming machine in accordance with one example embodiment of the present disclosure.

FIG. 3 shows an example of two example customizations in the form of two added sub-states 130 and 138 added to a presentation state and specifically to the spin reels state 120 described above and in accordance with one embodiment of the present disclosure. In this example, the spin reels state 120 with these two customizations include: (1) a spin all the reels sub-state 122; (2) a wait a period of time sub-state 128; (3) a display a clown laughing sub-state 130 (which is a first customization); (4) a stop one of the reels on the correct position sub-state 134; (4) a display anticipation graphic sub-state 138 (which is a second customization); and (5) a produce reel stopping sound sub-state 140. In this example, sub-states 128, 130, 134, 138, and 140 are repeated for each of the reels as indicated by diamond 124. In this example, after all of the reels are stopped, the EGM moves to the next state as indicated by block 190. Thus, these two customizations 130 and 138 add in: (1) a display of a clown laughing before each reel is stopped; and (2) a display of an anticipation graphic as each reel is stopped. These additional sub-states do not have an impact on the overall outcome of the play of the game or any awards resulting from the play of the game. These customizations change the way the play of the game is presented to the player and therefore how the game "feels" to the player. These example customizations add player selected audio-visual sub-states. These example customizations cause the game to be more personal for the player who created these customization (or obtained these customizations).

The present disclosure provides that the EGM can insert these customizations in any suitable programming fashion such as directly in the code, as call-outs in the code, as a sub-routine, or in any suitable manner. In certain embodiments, the code is originally formed with a respective customization call-out between the code for each state or at various suitable points in the instructions of the code. Thus, during execution of the code, when the process reaches such instructions, the processor looks for a customization associated with that call-out. When the EGM is first created, there are no customizations, so the processor essentially bypasses such call-out (that have no associated customizations). When one or more customizations are associated with the respective call-outs, when the processor reaches each call-out, if there is a customization associated with that call-out, the processor provides that customization. Additionally, states that include audio, video, or other functionality that can be changed or deleted by a customization, those states can be associated with a possible deletion or change call-out, and the processor looks for a customization associated with that call-out before providing that function. If no customization is associated with that call-out, the processor provides that function. If a customization is associated with that call-out, the processor provides the function associated with that call-out. It should be appreciated that these are only example potential ways of inserting the customizations into the code or instructions executed by the processor of the EGM or otherwise having the processor provide the customizations, and that other suitable programming techniques can be employed in accordance with the present disclosure to employ such customizations.

The present disclosure contemplates that the customizations can thus vary in numerous different manners. The following are examples of different types of customizations. These example customizations are not meant to limit the present disclosure. In various embodiments, each customization is specific for a reel game, a reel game theme, a reel, a plurality of reels, a card game, a card game theme, a card, or a hand of cards, a keno game, a keno card, a bingo game, a bingo card, an electronic table game, a social game, a virtual reality game, or a mobile game. For example, in various embodiments, for a card game, the customization can make a king, a queen, and/or a jack animate. For one such example, the customization can include the queen winking as a sign of good luck. In other examples, the customization can include specific sounds as one or more of the cards are dealt. In other examples, the customization can include an overlay over the cards, such that they are not seen as they are dealt and once all cards are dealt, all cards are revealed at once in a unique animation.

In various embodiments as indicated above, the customization creation system enables the player to create a customization that adds one or more uploaded images and/or sounds to the play of a game. In various embodiments, the stock images and/or sounds are selectable by the player from a library using a customization creation system. In various embodiments, the customization creation system enables the player to otherwise provide one or more images and/or related sounds. In various embodiments, the images can be pictures, graphics, or other suitable different types of images.

In various embodiments as indicated above, the customization creation system enables the player to create a customization that adds one or more uploaded videos and related sounds to the play of a game. In various embodiments, the stock video and relate sounds are selectable by the player from a library using a customization creation system. In various embodiments, the customization creation system enables the player to otherwise provide one or more video and/or related sounds.

In various embodiments, the customization creation system enables the player to create a customization of one or more of the triggering events that cause the EGM to changes states.

In various such embodiments, the customization creation system enables the player to create a customization that adjusts a timing of a state or sub-state. In various such embodiments, the customization can make a state longer or shorter. For example, the reel spin of the last reel to stop can be made shorter or longer via a customization.

In various embodiments, the customization creation system enables the player to create a customization that changes one or more of the parameters associated with one or more states or sub-states (including new created states or sub-states). In various embodiments, for each state, the EGM determines and causes the output of certain visual and/or audio based on one or more parameters. The parameters can determine which animation to display, which picture to display, which audio to produce, etc. The parameters can include, but are not limited to any of the following example parameters: (1) timing parameters; (2) color parameters; (3) picture parameters; (4) video or animation parameters; (5) sound or audio parameters; (6) attribute or function parameters (such as reels spinning forward or backwards); (7) size or geometric shape parameters (such as a change in the shape of one or more of the reels); (8) behavior parameters (such how to respond to an event, how to respond to player input, or how to respond to a gaming event); (9) speed parameters; (10) display layout parameters such as position on display or display order (which adds the ability for an element to be "in front of" another element); and/or (11) playback parameters.

Each of the parameters can be settable to a specific value, a random choice of the value, a range of values, or other characteristics. The different types of parameters are practically endless due to the practically endless different types of games and EGMs.

In various embodiments, the customization creation system enables the player to create a customization that changes a reel spin parameter that causes one or more of the reels to spin faster and to change the delay between reel stops. This example customization makes the game play faster.

In various embodiments, the customization creation system enables the player to create a customization that changes a reel spin parameter that causes one or more of the reels to spin backwards at one or more points in time (such as at random times). This example customization can make the game play seem more erratic and unpredictable.

In various embodiments, the customization creation system enables the player to create a customization that provides one or more customized persistence events. For example, the customization can add a points counter. The customization causes one point to be added to the counter each time a certain game event happens (such as a 3-cherry win). When the accumulated points reach a threshold, the customization can cause the gaming system to output an animation as part of the customized state. In various embodiments, the counter is maintained by the EGM. In various other embodiments, the counter is maintained remote from the EGM (such as tracked by a host such as the customization tracking system) such that a player's accumulated points can be associated with the player at different EGMs.

In various embodiments, the customization creation system enables a customization entity such as a casino to create customizations for a theme for one or more EGMs. In various such embodiments, the casino created customizations can be configured for the specific casino market. For example, a Las Vegas casino can create a customization that changes certain of the colors in a game (such as on the reels) to black and silver to match the colors of the Las Vegas Raiders.

The present disclosure contemplates that a customization creation system such as an EGM can enable a player to create customizations for one or more plays of a game via a customization interface. Example customization interfaces are described below.

Figure 4:
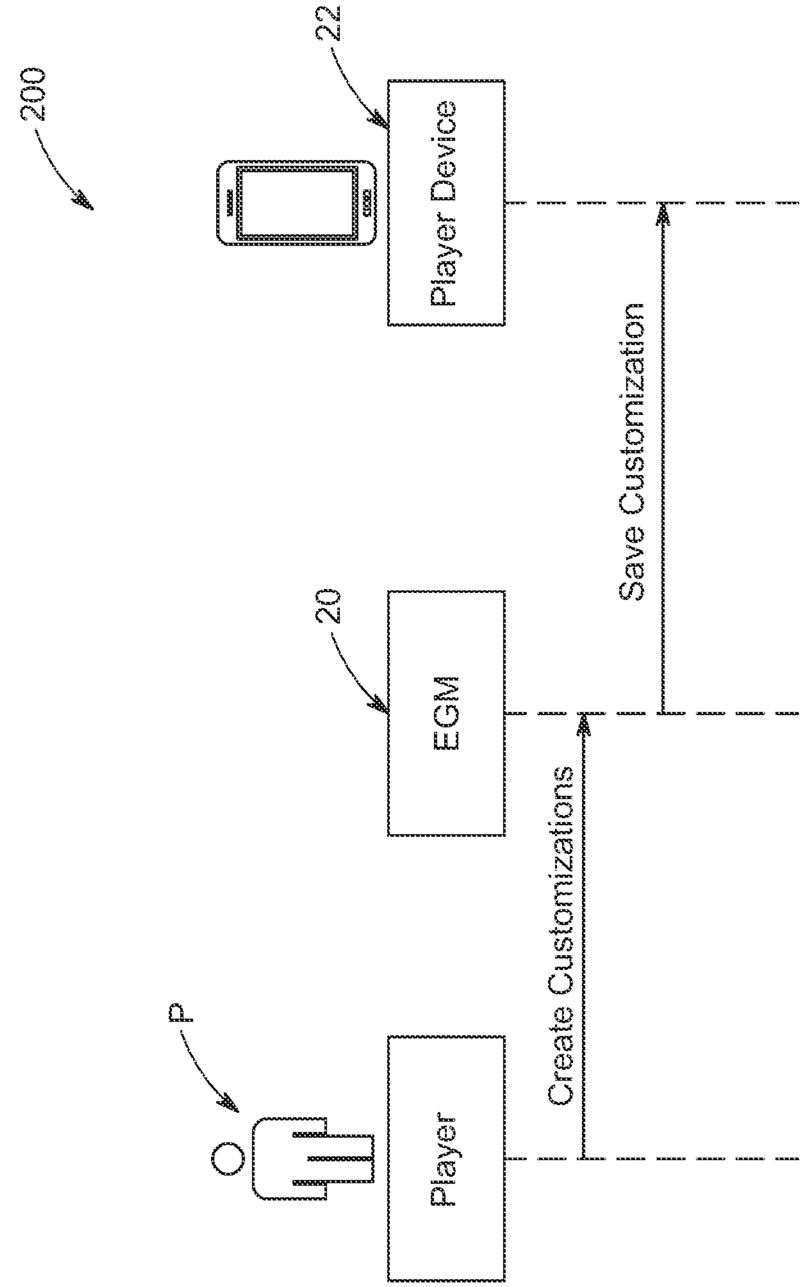
FIG. 4 is a diagrammatic view of a customization system configured to enable a player to make customizations via an EGM and to send such customizations to a player device for storage and subsequent access in accordance with one example embodiment of the present disclosure.

FIG. 4 shows an example customization system 200 that enables a player P to make customizations via an EGM 20 (that functions as a customization creation system) and to send such customizations to a player device 22 (such as a player cellular mobile telephone) that functions as a customization storage system. In various embodiments, the customization interface enables to the player to select customizations for one or more of the game states of the EGM 20 using the EGM 20 display screens and input devices (such as described below). The main or secondary display of the EGM 20 displays a service window that includes a suitable interface that include suitable options to enable the player to create one or more customizations. The EGM 20 saves such customizations on the EGM for the player for a gaming session on the EGM 20. The EGM 20 also sends the customizations to the player device 22 to enable the player device to store such customizations. The EGM 20 communicates with the player device 22 directly or indirectly using a wireless communication system (such as Bluetooth, WIFI, etc.). In other embodiments, the EGM 20 can communicate with the player device 22 indirectly such as though a remote host (not shown). In various embodiments, the EGM 20 thus enables the player to send the customizations to a player mobile application on the player device 22. The player device 22 can be configured to save these customizations and to subsequently provide these customizations back to the EGM 20 or another EGM (or other gaming systems) for use in a subsequent gaming session. The EGM 20 or player device 22 can also be configured to send these customizations to a customization marketplace. In various embodiments, the player device 22 can additionally be configured to modify the received customizations.

Figure 5:
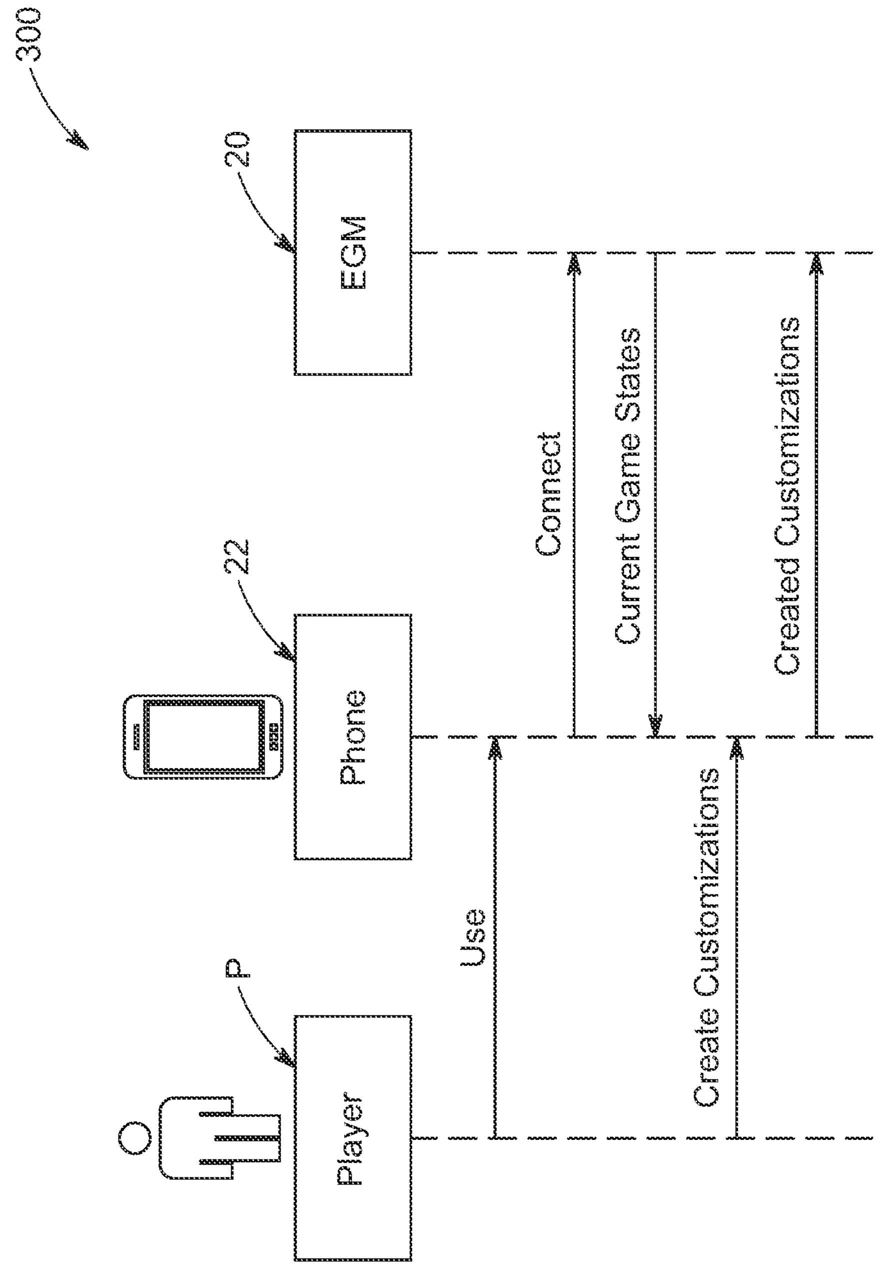
FIG. 5 is a diagrammatic view of a customization system configured to enable a player to make customizations via a player device and to send such customizations to an EGM for usage in accordance with one example embodiment of the present disclosure.

In various other embodiments, the customization system provides a customization interface that enables to the player to create customizations for one or more of the game states using a player device such as a player mobile device (having a customization application loaded thereon) or another device such as a personal computer. Various example embodiments are described herein using an interface displayed by a display device of a player mobile device via a mobile application on that player mobile device. For example, FIG. 5 shows an example customization system 300 that enables a player P to create one or more customizations via a player device 22 and to send such customizations to an EGM 20 in accordance with one example embodiment of the present disclosure. The player device 22 communicates with the EGM 20 directly or indirectly using a wireless communication system (such as Bluetooth, WIFI, etc.). In other embodiments, the player device 22 can communicate with the EGM 20 indirectly such as though a remote host (not shown). In this example, the player uses the player device 22 to connect to the EGM 20. This can be through a SMIB associated with the EGM 20, directly with the EGM 20, or via a host system as an intermediary.

In various embodiments, the EGM 20 sends the appropriate game state data (such as game state parameters) to the player device 22. The game state data can relate to all of the game states of the EGM 20, certain of the game states of the EGM 20, and/or certain of the sub-states of the EGM 20. In various embodiments, this state data can be sent automatically or can be sent as a request from the mobile application on the player device 22. In other embodiments, the player device 22 can obtain the game state data for the EGM 20 in another suitable manner. The mobile application on the player device 22 displays one or more interfaces that enable the player to create one or more customizations based on such state data for the EGM (and the parameters thereof). The mobile application on the player device 22 causes the player device 22 to send those customizations to the EGM 20. The EGM 20 can provide one or more plays of a game on the EGM 20 using such customizations. In various embodiments, the EGM 20 can automatically revert back to the default states when the player stops playing the EGM 20, cashes out, cards out, or otherwise stops the gaming session on the EGM 20.

As indicated above, in various embodiments, the player customizations are sent to and stored on a customization storage system. The system customization storage system can automatically or otherwise cause the player's customizations to be sent to an EGM and employed on that EGM. In various embodiments, when the player starts a gaming session on an EGM, the customization storage system can provide the player's customizations applicable for that EGM to that EGM.

In various embodiments, the player customizations are stored via the mobile application on the player device that functions as a customization storage system. In various such embodiments, the mobile application can automatically cause the customizations to be sent to an EGM and employed on the EGM when the player device connects to that EGM.

Figure 6:
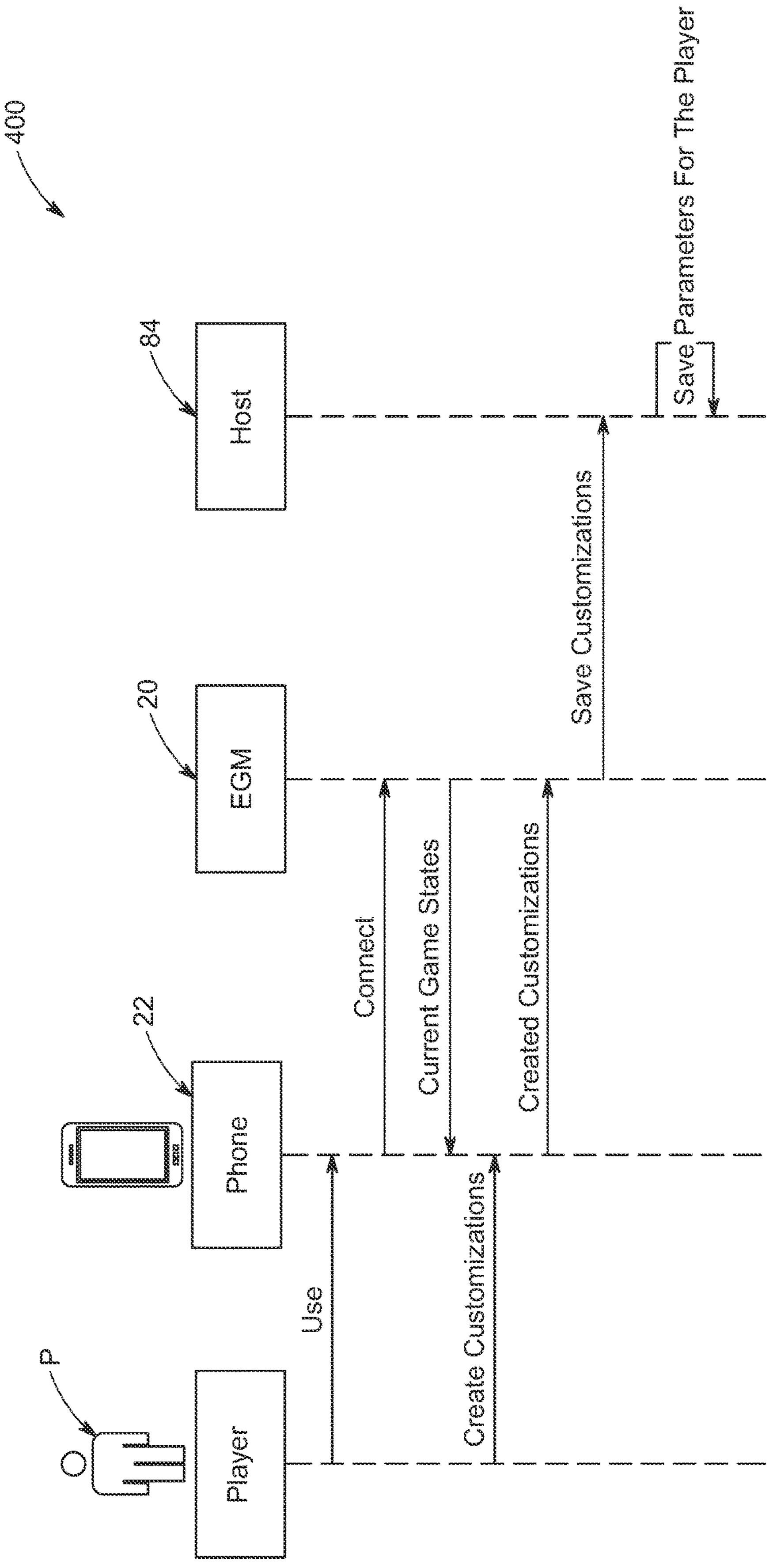
FIG. 6 is a diagrammatic view of a customization system configured to enable a player to make customizations via a player electronic device and to send such customizations to an EGM for usage, and wherein the EGM sends the customizations to a remote host for storage and subsequent usage on that EGM or another EGM in accordance with one example embodiment of the present disclosure.

FIG. 6 shows a customization system 400 that enables a player to make customizations via a player device 22 and to send such customizations to an EGM 20, wherein the EGM 20 sends the customizations to a remote host system 84 (that functions as a customization storage system) for storage and subsequent use on that EGM 22, another EGM, or a customization marketplace system in accordance with various embodiments of the present disclosure. In various such embodiments, the host system 84 would have data regarding which player is logged into the EGM 20 and can save the customizations created by that player in association with the player information and a player identifier (such as a player unique account number) for the player account on the host system 84 that functions as a customization storage system. In various embodiments, the customization storage system can save the game states to which such customizations are applicable.

Figure 7:
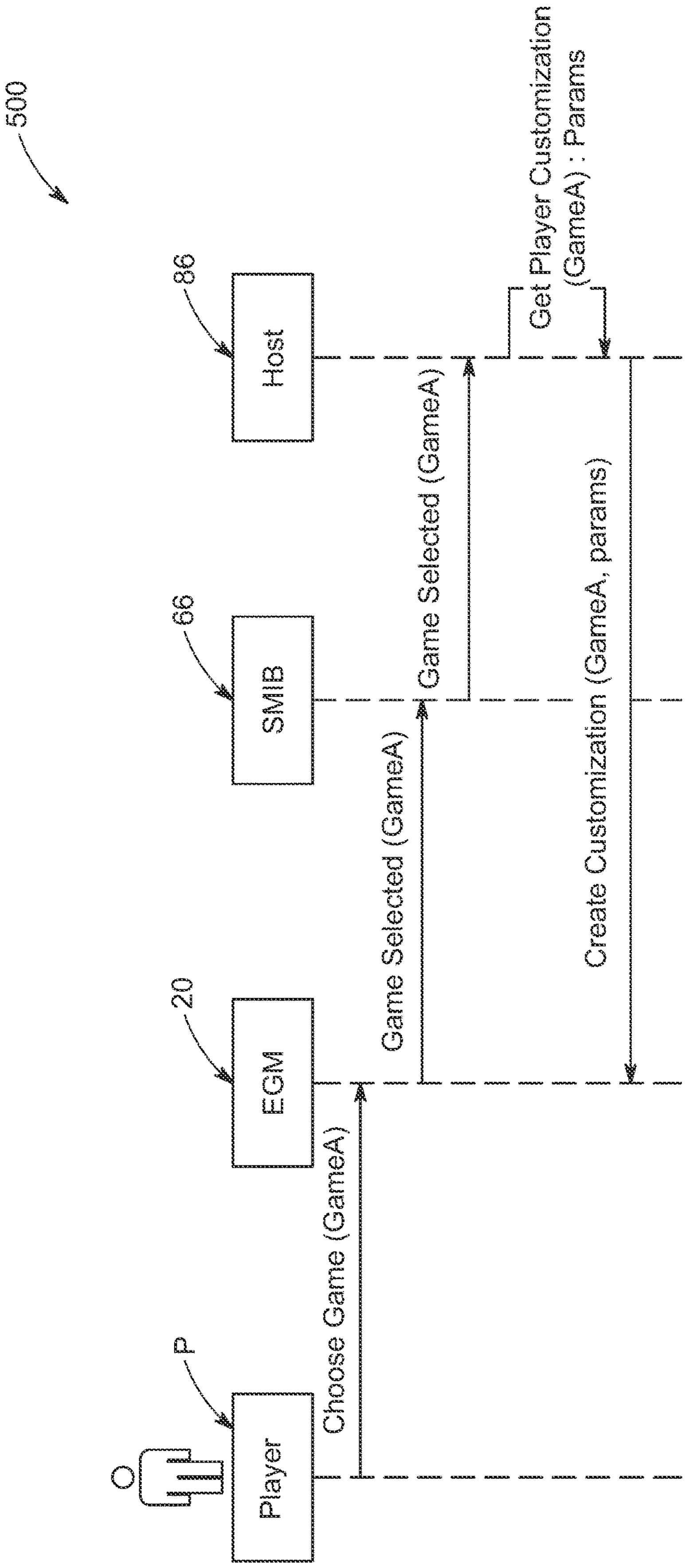
FIG. 7 is a diagrammatic view of a customization system wherein a remote host is configured to send customizations back to an EGM via a SMIB in accordance with one example embodiment of the present disclosure.

FIG. 7 shows a customization system 500 in which a remote host system 86 (such as a customization storage system) sends customizations to an EGM 20 via a SMIB 66. In this customization system, after the player P chooses a new game (here, Game A) on the EGM 20, the EGM 20 notifies a SMIB 66 associated with that EGM 20 of the new game selection, and the SMIB 66 notifies the remote host system 86. The remote host system 86 looks up the player customizations for the new game (here, Game A) and sends the player customizations back to the EGM 20. In this case the SMIB 66 is used and the "Game Selected (GameA)" message from the EGM 20 to SMIB 66 can be a SAS long poll 0x53 (Send Game N Configuration). In other embodiments, the EGM 20 does not need to use the SMIB for this feature, and in such case the EGM 20 can communicate directly with the remote host system 86. In various other embodiments, the EGM 20 can ask the player which customizations they would like to use via a suitable interface.

In various embodiments, the customization creation system enables the player to create and save one or more customizations for each game of an EGM.

In various embodiments, the customization creation system enables the player to cause the customization creation system to send one or more customizations to the customization marketplace system along with suitable data regarding the distribution of each of the customizations. This data can include, for each customization, but is not limited to: (1) whether to give the customization away for free to other players; (2) whether to charge other players for the customization; (3) how much to charge other players for the customizations; (4) eligibility of the customization (such as for members of the slot club or other club such as where a limited quantity of people are allowed to use this customization); and/or (5) a limited time of used for the customization (such as a holiday customization that is only available for use the next two weeks).

In various embodiments, the customization creation system enables the player to name the customizations to distinguish between each of the player's customizations (and each other customization obtained by the player). In various such embodiments, the customization storage system stores the customization with a unique name, the theme(s) to which the customization applies, the unique name of the player creating the customization.

In various embodiments, the customizations are digitally signed by the application, EGM, or host to authenticate the data and detect any changes. In various embodiments, an EGM will not accept a customization that is not authentic.

Figure 8:
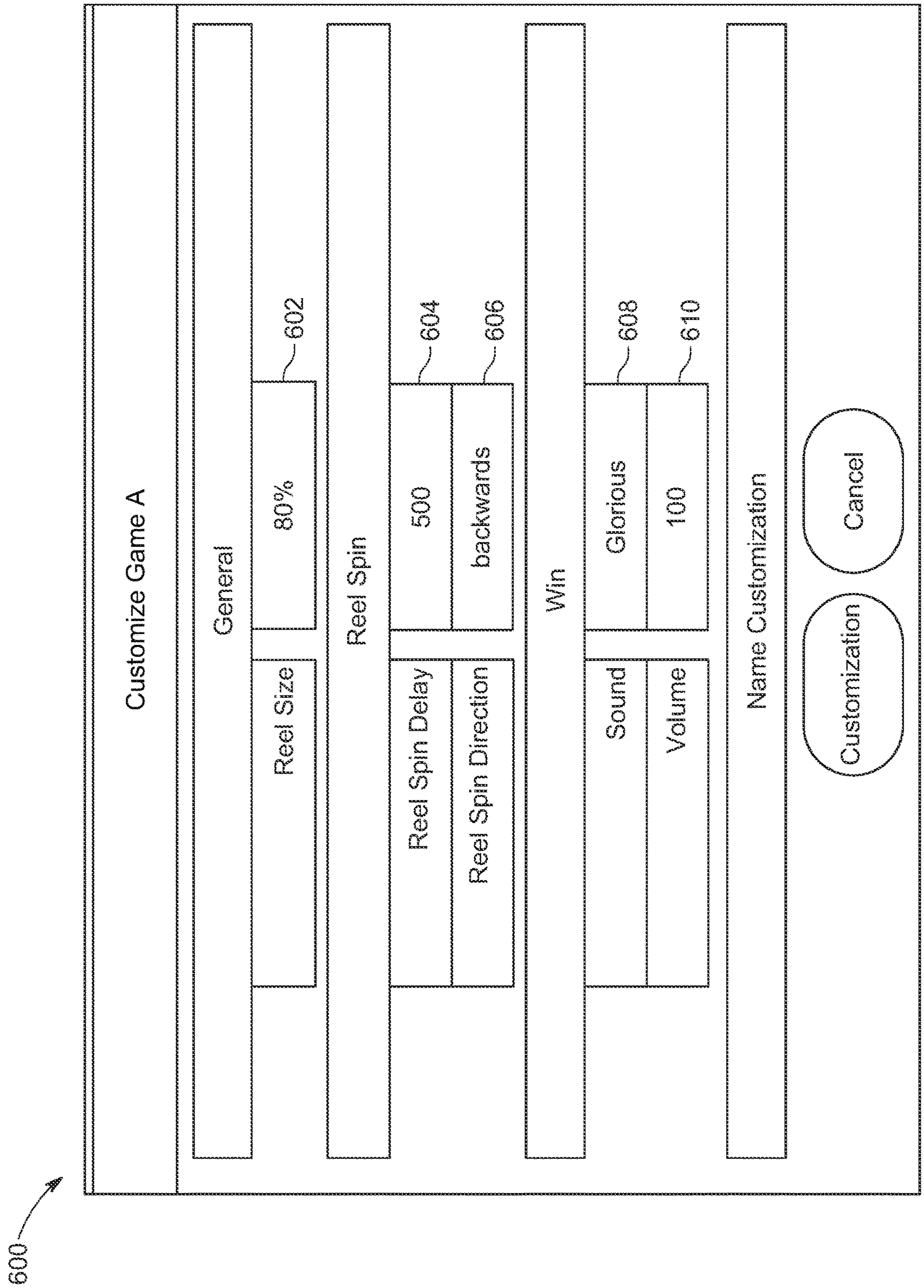
FIG. 8 shows an example user interface configured to enable a player to create a customization in accordance with one example embodiment of the present disclosure.

FIG. 8 shows an example user interface 600 provided by a customization creation system for the player to create customizations for a game (here, Game A). The interface 600 can be provided by an EGM 20 or a player electronic device 22. This example interface 600 enables a player to create customizations that adjust parameters of the reel spin state and the animate win state. Specifically, this example interface 600 enables the player to create a customization that changes the size of the video reels of the reel game as indicated by input 602. This example interface 600 enables the player to create a customization that changes the reel spin direction for the video reels of the reel game as indicated by input 604. This example interface 600 enables the player to create a customization that changes the sound for a win in the reel game as indicated by input 608. This example interface 600 enables the player to create a customization that changes the volume for a win in the reel game as indicated by input 610. This example interface 600 also can be alternatively configured to create other customizations and that apply to one or more or all presentation states.

Figure 9:
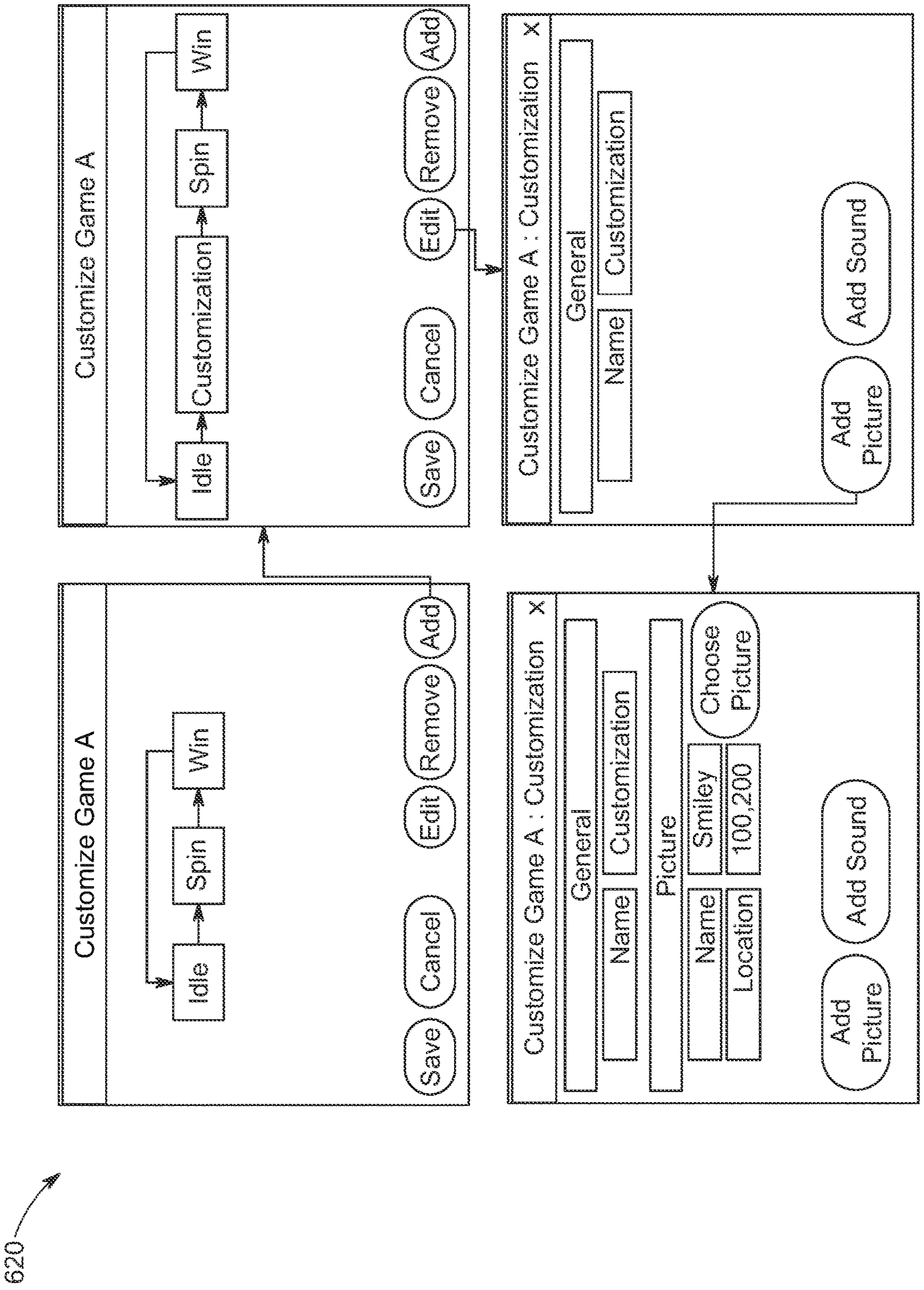
FIG. 9 shows an example user interface configured to enable a player to create a customization in accordance with another example embodiment of the present disclosure.

FIG. 9 shows another example user interface 620 for the player to create customizations for a game (here, Game A). The interface 600 can be provided by an EGM 20 or a player electronic device 22. This example interface 600 enables a player to create customizations that customize the game by adding a state that displays a picture before the reels spin. In various other embodiments, the interface can enable the player to create customizations that includes one or more animations, videos, or other images. This example interface enables the player to save any of the customizations that the player creates to a player customization account stored by a customization storage system.

It should be appreciated from the above that various embodiments of the present disclosure provide a gaming system (such as described below) that functions as a customization creation system, wherein the gaming system is configured to: (1) display of a first play of a wagering game, wherein the display of the first play of the wagering game comprises a plurality of different sequential presentation states of the wagering game; (2) cause a customization to be applied to the wagering game, wherein the customization: (a) comprises an additional presentation state added to the presentations states of the wagering game, (b) does not change any awards resulting from any play of the wagering game, and (c) does not change any probabilities of obtaining any awards from any play of the wagering game; and (3) display a second play of the wagering game, wherein the display of the second play of the wagering game comprises the presentation states of the wagering game and the additional presentation state of the customization. In various such embodiments, the gaming system is configured to enable a creation of the customization by a player. In various such embodiments, the gaming system is configured to display a customization creation interface to enable a creation of the customization by a player. In various such embodiments, the gaming system is configured to receive the customization from a customization storage system. In various such embodiments, the gaming system is configured to cause the customization to be sent to a customization storage system. In various such embodiments, the gaming system is configured to receive the customization from a customization marketplace system. In various such embodiments, the gaming system is configured to cause the customization to be sent to a customization marketplace system. In various such embodiments, the gaming system is configured to cause the customization to be sent to a customization marketplace system along with purchase price data for the customization.

It should further be appreciated from the above that various embodiments of the present disclosure provide a gaming system (such as described below) that functions as a customization creation system, wherein the gaming system is configured to: (1) display a first play of a wagering game, wherein the display of the first play of the wagering game comprises a plurality of different sequential presentation states of the wagering game; (2) cause a customization to be applied to the wagering game, wherein the customization: (a) comprises an additional presentation sub-state added to one of the presentations states of the wagering game, (b) does not change any awards resulting from any play of the wagering game, and (c) does not change any probabilities of obtaining any awards from any play of the wagering game; and (3) display a second play of the wagering game, wherein the display of the second play of the wagering game comprises the presentation states of the wagering game and the additional presentation sub-state of the customization added to said one of the presentations states. In various such embodiments, the gaming system is configured enable a creation of the customization by a player. In various such embodiments, the gaming system is configured to receive the customization from a customization storage system. In various such embodiments, the gaming system is configured to cause the customization to be sent to a customization storage system. In various such embodiments, the gaming system is configured to receive the customization from a customization marketplace system. In various such embodiments, the gaming system is configured to cause the customization to be sent to a customization marketplace system. In various such embodiments, the gaming system is configured to cause the customization to be sent to a customization marketplace system along with purchase price data for the customization.

It should be appreciated from the above that various embodiments of the present disclosure provide a gaming system (such as described below) that functions as a customization creation system, wherein the gaming system is configured to: (1) display a first play of a wagering game, wherein the display of the first play of the wagering game comprises a plurality of different sequential presentation states of the wagering game; (2) cause a plurality of different customizations to be applied to the wagering game, wherein each said customization: (a) comprises an additional presentation state or sub-state added to the plurality of different presentations states of the wagering game, such that one of the presentation states is between two of the customizations, (b) does not change any awards resulting from any play of the wagering game, and (c) does not change any probabilities of obtaining any awards from any play of the wagering game; and (3) display a second play of the wagering game, wherein the display of the second play of the wagering game comprises the plurality of different presentation states and the additional presentation states or sub-states of the customizations. In various such embodiments, the gaming system is configured to enable a creation of a first one of the customizations by a player. In various such embodiments, the gaming system is configured to receive a second one of the customizations.

Customization Storage System

As indicated above, in various embodiments, the present disclosure relates to systems and methods that store the customizations for subsequent usage by the customization entity that created the customization or for usage by one or more other players for one or more gaming systems. In various embodiments, after a customization is created, the customization creation entity will send the customization to the customization storage system for such storage and subsequent transmission and usage.

In various embodiments, the customization storage system includes: (1) one or more processors; (2) one or more memory devices; and (3) one or more communication systems, that co-act to receive customizations, store the received customizations, receive requests for the stored customizations, and transmit the requested stored customizations. The customization storage system can receive, store, and transmit the customizations as data in any suitable manners and any suitable formats.

In various embodiments, the customization storage system stores such customization using a customization creation entity account system.

Customization Tracking System

As indicated above, in various embodiments, the present disclosure also relates to systems and methods that track data regarding the customizations, and that are configured to receive, store, and provide that data to other components of the customization system for usage of that data by those other components of the customization system.

In various embodiments, after a customization is created, the customization creation entity will send the customization identification information to the customization tracking system for the creation and maintenance of a customization data tracking file for that customization.

In various embodiments, the customization tracking system includes: (1) one or more processors; (2) one or more memory devices; and (3) one or more communication systems, that co-act to receive customization related data, store the received customization related data, receive requests for the stored customization related data, and transmit the requested stored customization related data. The customization tracking system can receive, store, and transmit the customization related data in any suitable manners and any suitable formats.

In various embodiments, the customization storage system stores such customization related using a creator account system.

In various embodiments, the customization tracking system is configured to monitor the creation, usage, purchase, sale, and trading of customizations and create appropriate reports, analysis, and statistics for such customizations. In various such embodiments, the customization tracking system can be configured to track various different customization data including but not limited to the following data: each customization created via a customization creation system of the customization system, and for each such customization: (1) the game or games that the customization can be used on; (2) the game theme or game themes that the customization can be used on; (3) the EGM or EGM that the customization can be used on; (4) who created the customization; (5) when the customization was created; (6) the device used to create the customization; (7) the quantity of games played using such customization; (8) the quantity of people who use the customization; (9) the amount wagered on games with the customization; (10) the amount won from games played with the customization; (11) the quantity of bonuses occurring from games played with the customization; (12) the quantity of people who buy the customization; (13) the quantity of people who use the customization; and (14) the overall popularity of the customization.

In various embodiments, the EGMs and the other systems are configured to send various data relating to the customization and their usage to the customization tracking system, and the customization tracking system is configured to receive, accumulate, store, categorize, retrieve, and send such data in appropriate data formats and categories.

In various embodiments, the customization storage system and the customization tracking system can be a single system.

Customization Marketplace System

As indicated above, in various embodiments, the present disclosure also relates to systems and methods that enable one or more customizations for one or more gaming systems to be distributed to one or more players for one or more gaming systems. In various embodiments, this is accomplished via a customization marketplace system.

In various embodiments, after a customization is created, the customization creation entity can send the customization to the customization marketplace system for enabling distribution of that customization.

In various embodiments, the customization marketplace system includes: (1) one or more processors; (2) one or more memory devices; and (3) one or more communication systems, that co-act to receive customizations and related data, store the customizations and related data, receive requests for the customizations, and transmit the requested customizations. The customization marketplace system can receive, store, and transmit the customizations and related data in any suitable manners and any suitable data formats in accordance with the present disclosure.

In various embodiments, the customization marketplace system stores such customizations and related data using a creator account system wherein each customization creation entity can establish an account and use the account to distribute the customizations it creates.

In various embodiments, the customization marketplace system enables customization creation entities (such as players, casinos, and third parties) to distribute their customizations such as by sharing, trading, or selling such customizations.

In various embodiments, the customization marketplace system enables entities such as players to obtain such as by trading or buying customizations from such customization creation entities (such as players, casinos, and third parties).

In various embodiments, the customization marketplace system is configured to perform any of the following for customizations: (1) enable players to share customization with other players; (2) enable players to request customizations; (3) enable players to sell customizations; (4) enable player to buy customizations; (5) enable players to trade customizations; (6) share customizations without any cost to the receiving player; (7) share customizations at a cost to the receiving player; and/or (8) notify a player, an operator (such as a casino), and/or a gaming system manufacturer as to which customizations are the most popular.

In various embodiments, the customization marketplace system is configured to perform any of the following for customizations: (1) enable casinos and third parties to share customization with players; (2) enable casinos and third parties to request customizations from players; (3) enable casinos and third parties to sell customizations; (4) enable casinos and third parties to buy customizations; (5) enable casinos and third parties to trade customizations; (6) share customizations without any cost to the receiving player; and (7) share customizations at a cost to the receiving player.

In various embodiments, the customization marketplace system can be configured such that the fee to purchase customizations can be monetary or non-monetary (such as for player tracking points).

In various embodiments, the customization marketplace system is configured to enable players to buy the customizations using currency (or another suitable monetary payment method).

In various embodiments, the customization marketplace system is configured to enable players to buy the customizations using player loyalty points.

In various embodiments, the customization marketplace system is configured to enable players to buy the customizations using currency (or another suitable monetary payment method) or using player loyalty points.

In various embodiments, after receiving a customization from the customization marketplace system, a gaming system receiving the customization can use the received customization to provide that customization on that gaming system (such as for one or more displays of one or more plays of one or more games displayed by that gaming system).

In various embodiments, the customization marketplace system provides one or more interfaces that are accessible by players (such as via a mobile application on a player mobile device).

In various embodiments, the interfaces enable a player to access a list of different customizations and information regarding the games and/or gaming systems that each customization is applicable. These interfaces enable players to: (1) browse the customizations available from customization marketplace system; (2) select one or more customizations to obtain; (3) purchase such selected customization(s) if necessary; and (4) obtain access to such selected customizations.

In various embodiments, the customization marketplace system is configured to obtain such customization data from the customization tracking system. In other embodiments, the customization marketplace system maintains such data separate from the customization tracking system. In various embodiments, the customization marketplace system and the customization tracking system are a single system. In various embodiments, the customization marketplace system, the customization storage system, and the customization tracking system are a single system.

In various embodiments, the customization marketplace system is configured to cause a display of data such as one or more statistics regarding each of the customizations in the customization marketplace system. This data can include but is not limited to: (1) the quantity of people who use the customization; (2) the quantity of people who buy the customization; (3) the amount wagered on games employing the customization; (4) the quantity of games played employing the customization; (5) the amount won from games played employing the customization; (6) the quantity of bonuses occurring from games played employing the customization; (7) the terms of the purchase for the customization; (8) the games or additional themes the customization can be employed with; (9) the type of parameter(s) of the customization (such as pictures, sounds, etc.); (10) when the customization was created and who created the customization; and/or (11) similar customizations such that if the player likes one customization, the system can display similar customizations for the player.

In various embodiments, the customization marketplace system is configured to use these statistics to determine various information regarding the customizations. For example, in various embodiments, the customization marketplace system can use these statistics to determine which of the customizations are the most popular and display such indications in association with the displayed indications of the customizations via the interfaces provided by the customization marketplace system.

In various embodiments, the customization marketplace system is configured to use these statistics to set the prices for players to buy the customizations. For example, in various embodiments, the customization marketplace system can display (such as via an interface) information regarding such statistical based prices for the customizations.

In various embodiments, the customization marketplace system is configured to enable the customization creators to set the prices for players to buy their customizations. For example, in various embodiments, the customization marketplace system can display (such as via an interface) information regarding such customization creation entity set prices for the customizations.

In various embodiments, the customization marketplace system is configured to enable the customization buyers to offer prices to buy the customizations and enable the creators of such customizations to accept or reject such offers.

In various embodiments, the customization marketplace system is configured to display indications of the available customizations without any indications of the creators (or sellers) of the customizations.

In various embodiments, the customization marketplace system is configured to display indications of the available customizations with indications of the creators (or sellers) of the customizations.

In various such embodiments, the customization marketplace system is configured to enable a customization creation entity (such as a celebrity or influencer) to make their customizations available through the customization marketplace system.

In various such embodiments, the customization marketplace system is configured to display an indication of the customization entity (such as the celebrity or influencer) with the indication of the customization.

In various embodiments, the customization marketplace system is configured to enable a player to select a customization for viewing prior to deciding whether to obtain (such as purchase the customization), and thus can cause a display the customization to the player. In various embodiments, the customization marketplace system is configured to cause a display (such as via an interface) the customization by itself. In various embodiments, the customization marketplace system is configured to cause a display (such as via an interface) of the customization as part of a play of an example game play in which the customization can be employed.

In various embodiments, the customization marketplace system is configured to enable players to obtain (such as buy) the customizations for: (1) use indefinitely; (2) use for a period of time; (3) for use for a quantity of plays of one or more games; or (4) use for a quantity of gaming sessions.

In various embodiments, the customization marketplace system is configured to enable use of the customization marketplace system and the purchase of the available customizations without any membership requirements for the customization marketplace system.

In various embodiments, the customization marketplace system is configured to require a membership for use of the customization marketplace system and the purchase of the available customizations at the customization marketplace system. In various such embodiments, the customization marketplace system is configured to require a membership for the seller's group (such the celebrity or influencers group) to use of the customization marketplace system and to purchase of the available customizations of the seller at the customization marketplace system.

In various such embodiments, the customization marketplace system is configured to require a player to be a follower of a seller (such the celebrity or influencers group) of a customization available at the customization marketplace system, or on a social network to use of the customization marketplace system and to purchase of the available customizations of the seller at the customization marketplace system.

FIG. 10 shows an example interface 700 that a customization marketplace system can employ in accordance with the present disclosure. This example interface 700 shows the popular customizations for Game A. This example interface displays indications of three example customizations for Game A and the respective names of these customization. The customizations include: (1) a first example customization that is free; (2) a second example customization that cost $1 to purchase; and (3) a third example customization that is cost $5.00 to purchase. This example interface 700 also displays indications of: (1) a total amount won for plays of the games that employed the first example customization; (2) a total amount won for plays of the games that employed the second example customization; and (3) a total amount won for plays of the games that employed the third example customization. This example interface 700 further displays indications of: (1) a total quantity of player that have played games that employed the first example customization; (2) a total quantity of player that have played games that employed the second example customization; and (3) a total quantity of player that have played games that employed the third example customization. It should be appreciated from the example interface that the customization marketplace system can display any suitable information for each customization that is available via the customization marketplace system.

It should be appreciated from the above that various embodiments of the present disclosure provide a gaming system customization marketplace system configured to: (1) receive, from a first system, a customization that is applicable to a wagering game, wherein the wagering game comprises a plurality of different sequential presentation states and wherein the customization: (a) comprises an additional presentation state configured to be added to the presentations states of the wagering game, (b) does not change any awards resulting from any play of the wagering game, and (c) does not change any probabilities of obtaining any awards from any play of the wagering game; (2) store the customization; (3) cause a display, by a display device, of an indication of the customization; and (4) send the customization to a gaming system that is different than the first system such that the customization can be applied to a play of the wagering game displayed by the gaming system and such that the gaming system can display a play of the wagering comprising the presentation states and the additional state of the customization. In various such embodiments, the first system comprises a customization creation system. In various such embodiments, the first system comprises a customization storage system. In various such embodiments, the gaming system customization system is configured to cause a display by a display device remote from the system of customization data in association with the display of the indication of the customization. In various such embodiments, the customization data comprises an indication of popularity of the customization. In various such embodiments, the gaming system customization system is configured to cause a display by a display device remote from the system of an indication of a purchase price for the customization in association with the display of the indication of the customization. In various such embodiments, the gaming system customization system is configured to cause a display by a display device remote from the system of any images of the customization. In various such embodiments, the gaming system customization system is configured to cause a display by a display device remote from the system of an example play of the wagering game comprising the customization.

It should further be appreciated from the above that various embodiments of the present disclosure provide a gaming system customization marketplace system configured to: (1) cause a display of indications of different customizations for a wagering game, wherein each customization: (a) comprises an additional presentation state configured to be added to presentations states of the wagering game, (b) does not change any awards resulting from any play of the wagering game, and (c) does not change any probabilities of obtaining any awards from any play of the wagering game; (3) receive a request for one of the customizations; and (4) send the requested customization to a gaming system such that the customization can be applied to a play of the wagering game displayed by the gaming system and such that the gaming system can display a play of the wagering game comprising the presentation states and the additional state of the customization. In various such embodiments, the gaming system customization system is configured to receive the customizations from a plurality of different customization creation systems. In various such embodiments, the gaming system customization system is configured to cause a display by a display device remote from the system of customization data in association with the display of each of the indications of the customizations. In various such embodiments, the customization data comprises for each customization an indication of popularity of the customization. In various such embodiments, the customization data comprises for each customization an indication of a purchase price for the customization. In various such embodiments, the customization data comprises for each customization an indication of a quantity of games played that employed the customization. In various such embodiments, the customization data comprises for each customization an indication of a quantity of players that have purchased the customization. In various such embodiments, the gaming system customization marketplace system is configured to cause a display by a display device remote from the system for each customization any images of the customization.

It should further be appreciated from the above that various embodiments of the present disclosure provide a gaming system customization marketplace system configured to: (1) cause a display for each of a plurality of different wagering games, indications of different customizations associated with said wagering game, wherein for each wagering game each customization associated with the wagering game: (a) comprises an additional presentation state configured to be added to presentations states of the wagering game, (b) does not change any awards resulting from any play of the wagering game, and (c) does not change any probabilities of obtaining any awards from any play of the wagering game; (2) receive a request for one of the customizations; and (3) send the requested customization to a gaming system such that the customization can be applied to the wagering game associated with the customization such that the wagering game comprises the presentation states and the additional state of the customization. In various such embodiments, the gaming system customization marketplace system is configured to receive the customizations from a plurality of different gaming systems. In various such embodiments, the gaming system customization marketplace system is configured to cause a display by a display device remote from the system of customization data in association with the display of each of the indications of the customizations, wherein customization data comprises for each customization an indication of popularity of the customization. In various such embodiments, the gaming system customization marketplace system is configured to cause a display by a display device remote from the system of customization data in association with the display of each of the indications of the customizations, wherein customization data comprises for each customization an indication of a purchase price for the customization.

Gaming System Configuration System

As indicated above, various systems of the present disclosure enable the storage, tracking, and usage of customizations and customization related data to enable gaming system creators to employ such customizations and related data to create enhanced future gaming systems. Various embodiments of the present disclosure provide one or more configuration systems that facilitate the usage of customizations and related data to better enable the creation of future gaming systems. The example gaming system configuration system(s) is/are referred to herein as the "configuration system(s)" for brevity.

In various embodiments, the configuration system includes: (1) one or more processors; (2) one or more memory devices; and (3) one or more communication systems, that co-act to receive customizations and related data, store the customizations and related data, and use the customizations and related data to configure existing and/or future games and gaming systems. The configuration system can receive, store, and use the customizations and related data in any suitable manners and any suitable data formats in accordance with the present disclosure.

In various embodiments, the configuration system is configured to receive a first customization that is applicable to a wagering game, receive customization data related to the first customization, and based on the customization data, use the first customization to configure an existing or future gaming system. In various such embodiments, the customization data includes popularity data regarding the customization and the configuration system bases the decision on whether to employ the customization on existing or future gaming systems based on that data.

In various embodiments, the configuration system is configured to receive a plurality of different customization that are applicable to a wagering game, receive customization data related to those customization, and based on the customization data, use one or more of the customizations to configure an existing or future gaming system. In various such embodiments, the customization data includes popularity data regarding the customizations and the configuration system basis the decision on whether to employ the customization on existing or future gaming systems based on that data.

In various embodiments, the configuration system is configured to receive a plurality of different customization that are applicable to a wagering game, receive customization data related to those customization, and based on the customization data, use parts of a plurality of the customizations to configure an existing or future gaming system with a new customization that includes the parts of the respective customizations. In various such embodiments, the customization data includes popularity data regarding the customizations and the configuration system basis the decision on whether to employ the parts of those customizations on existing or future gaming systems based on that data.

In various embodiments, the configuration system is configured to obtain customizations and related customization data from the customization storage system and from the customization tracking system. In other embodiments, the configuration system maintains such customization and customization data separate from the customization storage system and the customization tracking system. In various embodiments, the configuration system uses the information from the customization tracking system to employ one or more customizations, to modify one or more existing gaming systems, and/or in the creation of one or more new gaming systems. In various embodiments, the configuration system and the customization tracking system are a single system. In various embodiments, the configuration system, the customization storage system, and the customization tracking system are a single system.

In various embodiments, the configuration system uses specific customizations automatically in the creation of future gaming systems.

In various embodiments, the configuration system uses specific customizations based on certain data (such as statistics and/or metrics) regarding those customizations.

In various embodiments, the configuration system enables the use of specific customizations to be performed selectively by a game or gaming system creator in the creation of future games and gaming systems.

In various embodiments, the configuration system enables the use of a customization exactly in exact form of such customization (i.e., without changing that customization).

In various embodiments, the configuration system enables the use of a customization in a modified form of such customization (i.e., that changes that customization).

In various embodiments, the configuration system is configured to create a new customization with one or more modifications to a previously created customization (i.e., changing that customization), and employ that customization to modify one or more existing gaming systems or in the creation of one or more new gaming systems.

In various embodiments, the configuration system is configured to create a new customization based on one or more elements from one or more customizations (such as a popular customization), and employ that customization to modify one or more existing games or gaming systems or in the creation of one or more new games or gaming systems.

In various embodiments, the configuration system is configured to use one or more of the most popular customizations and apply them to one or more games or gaming systems on a casino floor (or a virtual casino of an online casino).

In various embodiments, the configuration system is configured to automatically employ one or more customizations on one or more EGMs.

In various such embodiment, the configuration system can base such automatic usages of customizations on the customization statistics from customization tracking system (to determine the most popular customizations).

In various embodiments, the configuration system is configured to make suggestions to an operator to enable an operator to employ customizations on one or more EGMs.

In various embodiments, the configuration system is configured to enable an operator to employ customizations on one or more EGMs.

In various embodiments, the configuration system selects a popular customization and causes that customization to be employed as is in one or more existing or new EGMs.

In one example embodiment, the configuration system selects a customization created by a player named Bob. Bob has used a customization creation system to create a customization that includes a funny message before each small win (such as before each win of less than 10 credits). Bob's customization works on any 5-reel slot EGM. Bob's customization is the most popular in the past 30 days based on the quantity of other players that have obtained Bob's customization via the customization marketplace system described above and the quantity of game plays by such other players that have employed Bob's customization as determined by the customization tracking system. Based on this information, the configuration system causes Bob's customization to be employed by a plurality of 5-reel slot EGM on a casino floor in a casino. Based on this information, the configuration system causes Bob's customization to be employed in a plurality of new 5-reel slot EGMs that are to be installed on the casino floor.

In various other embodiments, the configuration system selects multiple popular customizations, uses those customizations to create a new customization with parts from each of those customizations, and causes that new customization to be employed as is in one or more existing or new EGMs.

Figure 11:
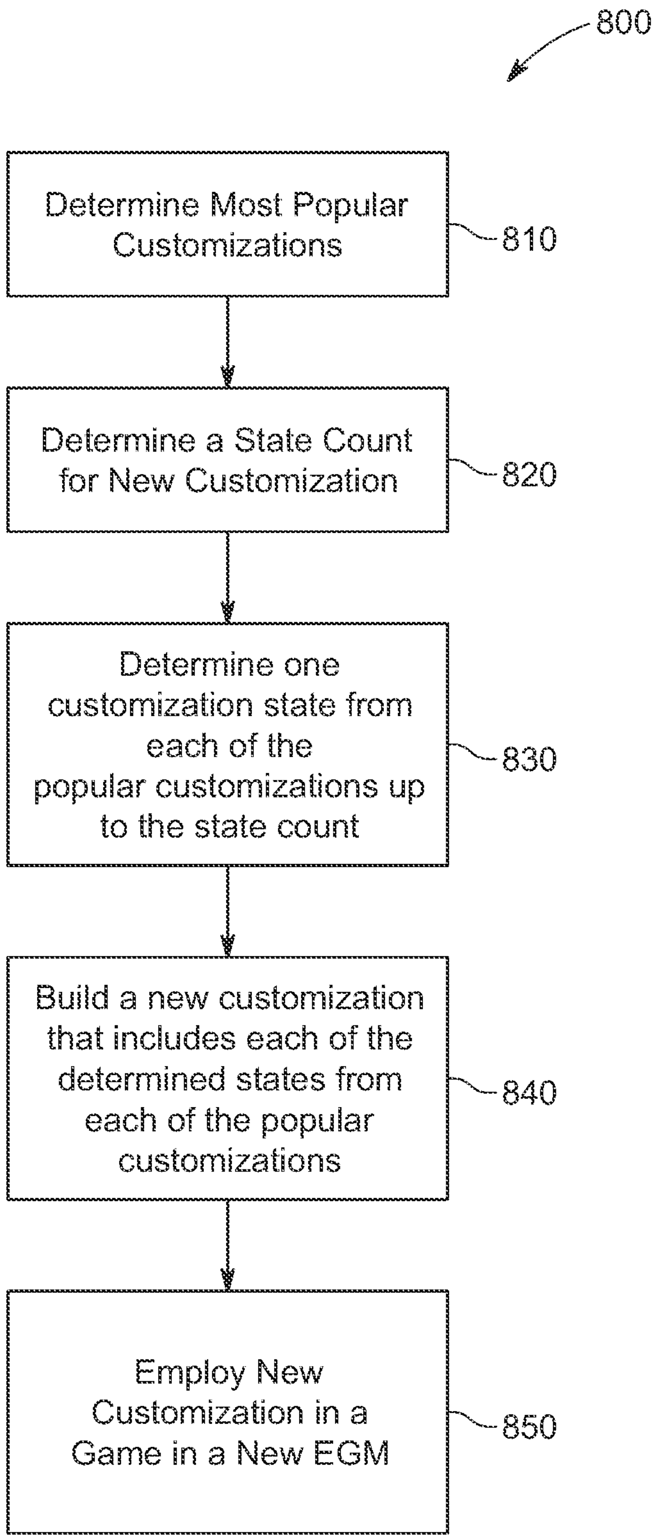
FIG. 11 is a flowchart showing an example method for a gaming system configuration system to create a new customization in accordance with one example embodiment of the present disclosure.

FIG. 11 shows an example process 800 for a configuration system to create and employ a new customization for a new gaming system in accordance with one example embodiment of the present disclosure. This example includes hundreds of different customizations stored in the customization storage system.

The first step includes the configuration system determining the most popular of the stored customizations, as indicated by block 810. This includes sorting the customizations by suitable customization usage data such one or more of the customization data described above. This can include determining the most popular customization of each type of customization. For example, this can include determining: (1) the most popular customization for a win animation; (2) the most popular customization for a lose animation; and (3) the most popular customization for a large win amount. In other embodiments, this can include determining the most popular customizations in another manner such as by demographic, game type, game configuration, or other customization data.

The second step includes the configuration system determining a state count for the new customization, as indicated by block 820. The state count is the quantity of states that will be in the new customization. For example, the new customization can have 3 states. This state count entered by an operator, predetermined in the configuration system, or learned by the configuration system over time (e.g., the most popular customizations have 4 unique events or states).

The third step includes the configuration system determining a state from each customization from each of the popular customizations up to the state count, as indicated by block 830.

The fourth step includes the configuration system building a new customization using each of the determined states from each of the popular customizations, as indicated by block 840.

The fifth step includes the configuration system employing the new customization for a game in a new EGM, as indicated by block 850.

Figure 12:
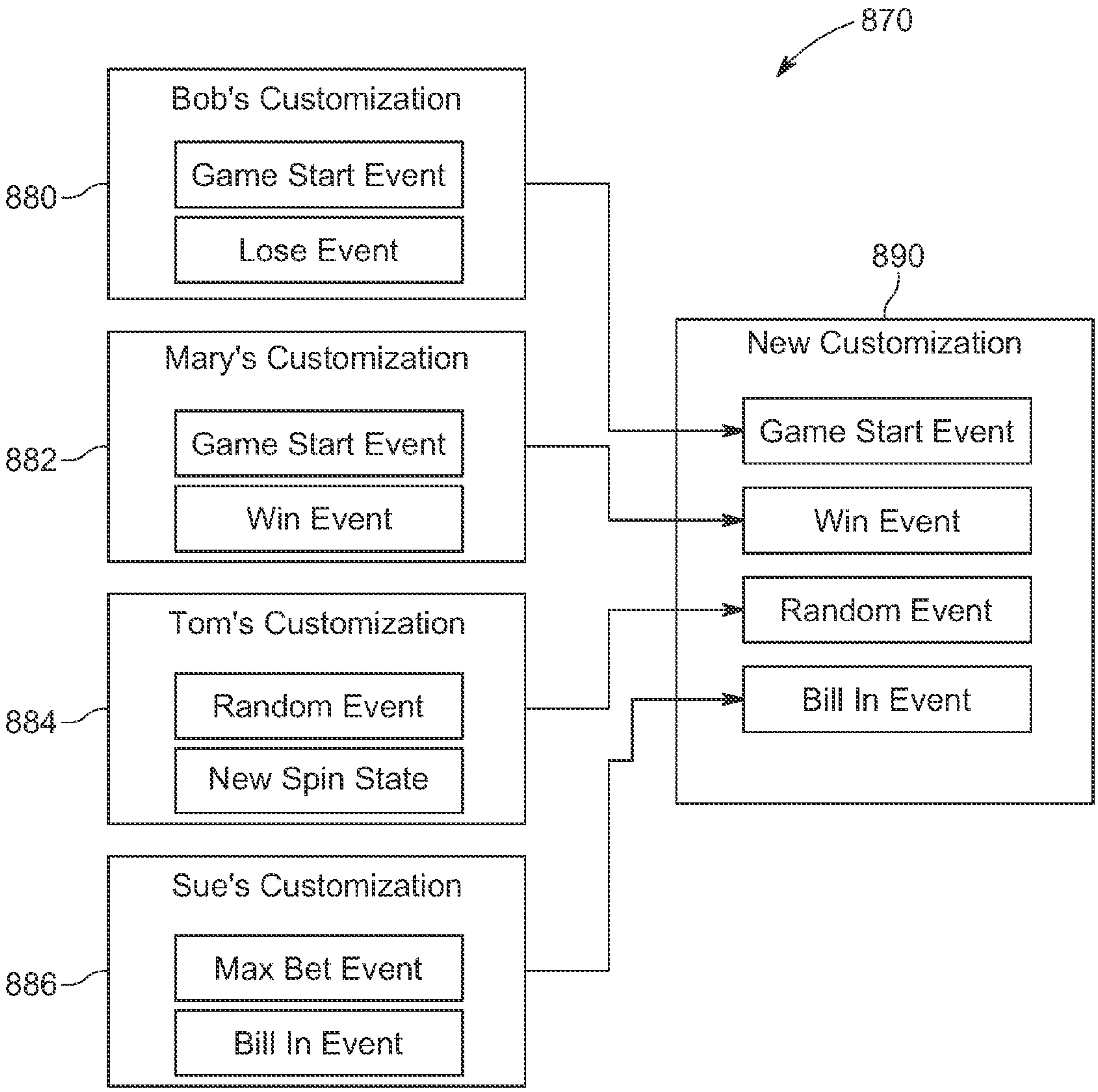
FIG. 12 is a diagrammatic view of popular customizations and a new customization created by a gaming system configuration system in accordance with one example embodiment of the present disclosure.

FIG. 12 shows an example implementation 870 of this process 850.

In this example, all of the customizations are ranked by popularity over a period of time. Bob's customization 880 is the most popular, Mary's customization 882 is the next most popular, Tom's customization 884 is the next most popular, and the Sue's customization 886 is the next most popular. The configuration system decides to create a new customization 890 with 4 states. The process includes the configuration system taking one customization state from each of these top 4 customizations. In this case, the configuration system randomly choose one state from Bob's customization 880, one state from Mary's customization 882, one state from Tom's customization 884, and one state from Sue's customization 886. This results in a completely new customization 890 with 4 states to add to a game or EGM based on these four most popular customizations.

In various embodiments, after the configuration system creates and employs a new customization, the configuration system can evaluate how popular the new customization is. If the new customization does not match a popularity threshold, the configuration system can be repeat the process such that different random states are chosen from the most popular customizations to create and employ such further new customization. This process of creating and employing new customization can be repeated until a customization is created the exceeds the popularity threshold.

In various embodiments, the configuration system is configured to determine the popular customizations and which elements are common across those popular customizations. For example, the top five most popular customizations can all have a unique game start event that is a specific sound. The configuration system uses this information to build a new customization such that the new customization will have a unique start event sound.

In various embodiments, the configuration system is configured to determine that the top five most popular customizations have a unique win event animation. The configuration system uses this information to build a new customization such that the new customization has a unique win event. In this manner, the configuration system determines which types of states are popular, and then builds new customizations with those type of states from existing popular customizations.

In various embodiments, the configuration system is configured to use one or more customization templates.

Figure 13:
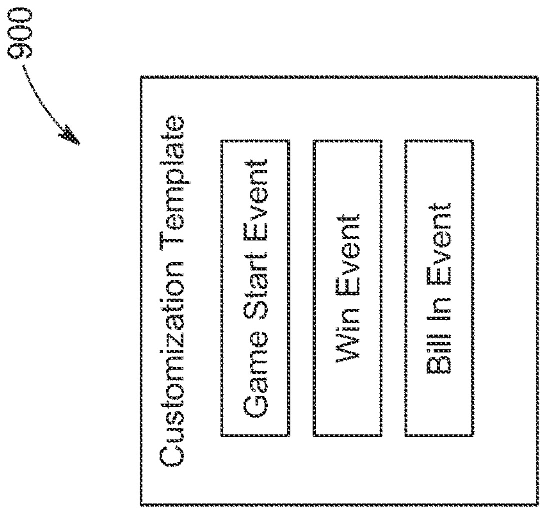
FIG. 13 is a diagrammatic view of a customization template usable by a gaming system configuration system to create a new customization in accordance with one example embodiment of the present disclosure.

FIG. 13 shows an example customization template. This customization template 900 can be created by a casino operator, an EGM manufacturer, the configuration system (such as using artificial intelligence), or other entity. The customization template 900 provides a desired format for a customization. In this example, the customization template has three states including a unique game start event state, a win event state, and a bill in state.

Figure 14:
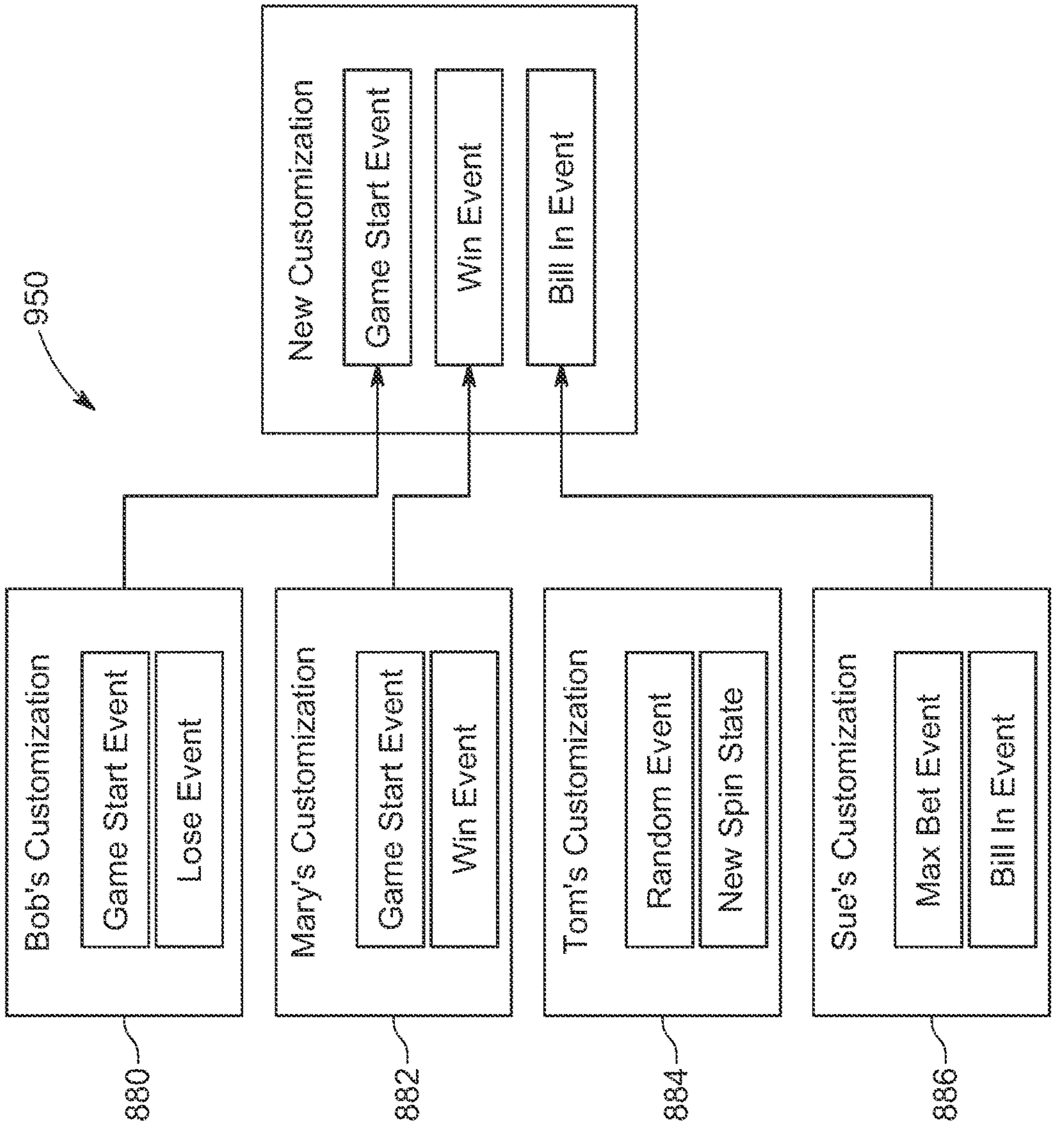
FIG. 14 is a diagrammatic view of popular customizations and a new customization created by a gaming system configuration system using the customization template of FIG. 13 in accordance with one example embodiment of the present disclosure.

FIG. 14 shows how the configuration system can employ this customization template 900. In this example, the customizations 880, 882, 884, and 886 are ranked in the same manner as in the above example. The configuration system picks the game start event from the Bob customization 880 and the Win Event from the Mary customization 882. Since the Tom customization 884 does not have any elements in the customization template, the configuration system skips use of the Tom customization 884. The configuration system uses the Sue customization 886 to provide the bill in event. This results in a new customization with three states that correspond to the categories of the customization template, and with the specific states taken from the popular customizations provided by Bob, Mary, and Sue (but not Tom).

In various embodiments, use of the new customization by the configuration system can provide benefits to the people from whose customizations were used to build the new customization. In various embodiments, the configuration system can provide specific benefits associated with uses of specific states for the new customization. In various embodiments, the benefit can be a recognition such as "Bob helped with this customization" or "Bob's Game Start Customization" is shown to people using the new customization. In various embodiments, the benefits can be monetary. The monetary benefit can be determined in any suitable manners such as but not limited to: (1) based on wagers or wins from using the new customization; (2) player tracking points or other virtual currencies; (3) static money awards; and/or (4) free plays.

In various embodiments, the configuration system can return the new customization to the customization marketplace system, and that system can offer that new customization for sale, and cause at least part of the purchase price to be provided to the creators of the customizations that were used to create the new customization.

It should be appreciated from the above that various embodiments of the present disclosure provide a gaming system configuration system configured to: (1) receive, from a first system separate from the gaming system configuration system, a first customization that is applicable to a first wagering game of a first gaming system, wherein the first wagering game comprises a plurality of different sequential presentation states and wherein the customization: (a) comprises an additional presentation state configured to be added to the presentations states of the first wagering game, (b) does not change any awards resulting from any play of the first wagering game, and (c) does not change any probabilities of obtaining any awards from any play of the first wagering game; (2) determine first customization data related to the first customization; and (3) based on the first customization data, use the first customization to configure a second gaming system to comprise a second wagering game with the additional presentation state of the first customization. In various such embodiments, the first system comprises a customization creation system. In various such embodiments, the first system comprises a customization storage system. In various such embodiments, the first system is the first gaming system. In various such embodiments, the second gaming system is an existing gaming system in a casino. In various such embodiments, the second gaming system is a new gaming system for a casino. In various such embodiments, the first wagering game and the second wagering game are a same type of wagering game. In various such embodiments, the gaming system configuration system is configured to determine first customization data related to the first customization based on data received from a second system separate from the gaming system customization marketplace system.

It should further be appreciated from the above that various embodiments of the present disclosure provide a gaming system configuration system configured to: (1) receive, from a first system separate from the gaming system configuration system, a plurality of different customizations that are applicable to a first wagering game of a first gaming system, wherein the first wagering game comprises a plurality of different sequential presentation states and wherein each customization: (a) comprises an additional presentation state configured to be added to the presentations states of the first wagering game, (b) does not change any awards resulting from any play of the first wagering game, and (c) does not change any probabilities of obtaining any awards from any play of the first wagering game; (2) determine customization data related to each of the customizations; and (3) based on the customization data, use the customizations to create a new customization and configure a second gaming system to comprise a second wagering game with an additional presentation state of the new customization. In various such embodiments, the additional presentation state of the new customization comprises one of the additional presentation states of one of the customizations. In various such embodiments, the gaming system configuration system is configured to, based on the customization data, use the customizations to create the new customization to configure the second gaming system to comprise the second wagering game with a plurality of additional presentation states of the new customization. In various such embodiments, wherein the additional presentation states of the new customization comprise one of the additional presentation states of each one of the customizations. In various such embodiments, wherein additional presentation states of the new customization comprise one of the additional presentation states of each one of the customizations except for one of the customizations. In various such embodiments, the additional presentation states of the new customization are based on a template for the additional presentation state of the new customization. In various such embodiments, the first system comprises a customization storage system. In various such embodiments, the second gaming system is an existing gaming system in a casino. In various such embodiments, the second gaming system is a new gaming system for a casino. In various such embodiments, the first wagering game and the second wagering game are a same type of wagering game.

It should further be appreciated from the above that various embodiments of the present disclosure provide a gaming system configuration system configured to: (1) determine customization data related to each of a plurality of customizations for a first type of wagering game, wherein the first type of wagering game comprises a plurality of different sequential presentation states and wherein each customization: (a) comprises an additional presentation state configured to be added to the presentations states of the first type of wagering game, (b) does not change any awards resulting from any play of the first type of wagering game, and (c) does not change any probabilities of obtaining any awards from any play of the first type of wagering game; and (2) based on the customization data, use the customizations to create a new customization and to configure a wagering game of a gaming system with the new customization. In various such embodiments, the new customization comprises a plurality of additional states from the customizations.

In various embodiments, one or more awards provided in association with the games disclosed herein include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

In various embodiments, one or more of the determinations described herein can be predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

The above-described embodiments of the present disclosure can be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more servers; (b) one or more electronic gaming machines such as those located on a casino floor; and/or (c) one or more personal gaming devices. Thus, in various embodiments, the gaming system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the gaming system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a server through a data network.

In certain embodiments in which the gaming system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the gaming system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the gaming system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the gaming system includes a server and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a player before enabling that player to place any wagers on any plays of any wagering games. In one example, the server identifies the player by requiring a player account of the player to be logged into via an input of a unique username and password combination assigned to the player. The server may, however, identify the player in any other suitable manner, such as by validating a player tracking identification number associated with the player; by reading a player tracking card or other smart card inserted into a card reader (as described below); by validating a unique player identification number associated with the player by the server; or by identifying the EGM (or personal gaming device), such as by identifying the MAC address or the IP address of the Internet facilitator. In various embodiments, once the server identifies the player, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 15:
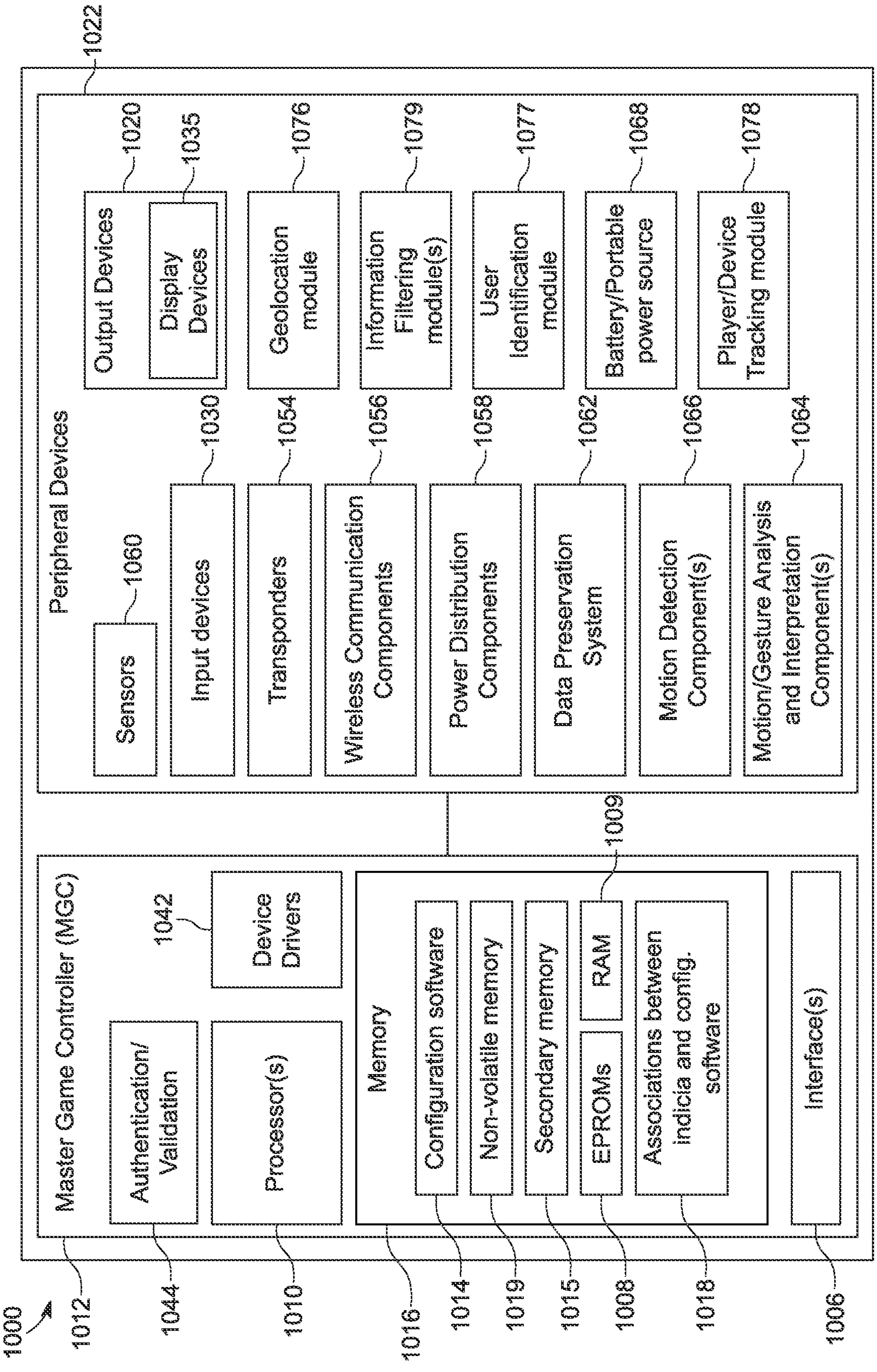
FIG. 15 is a schematic block diagram of one embodiment of an electronic configuration of one example gaming system disclosed herein.
Figure 16A:
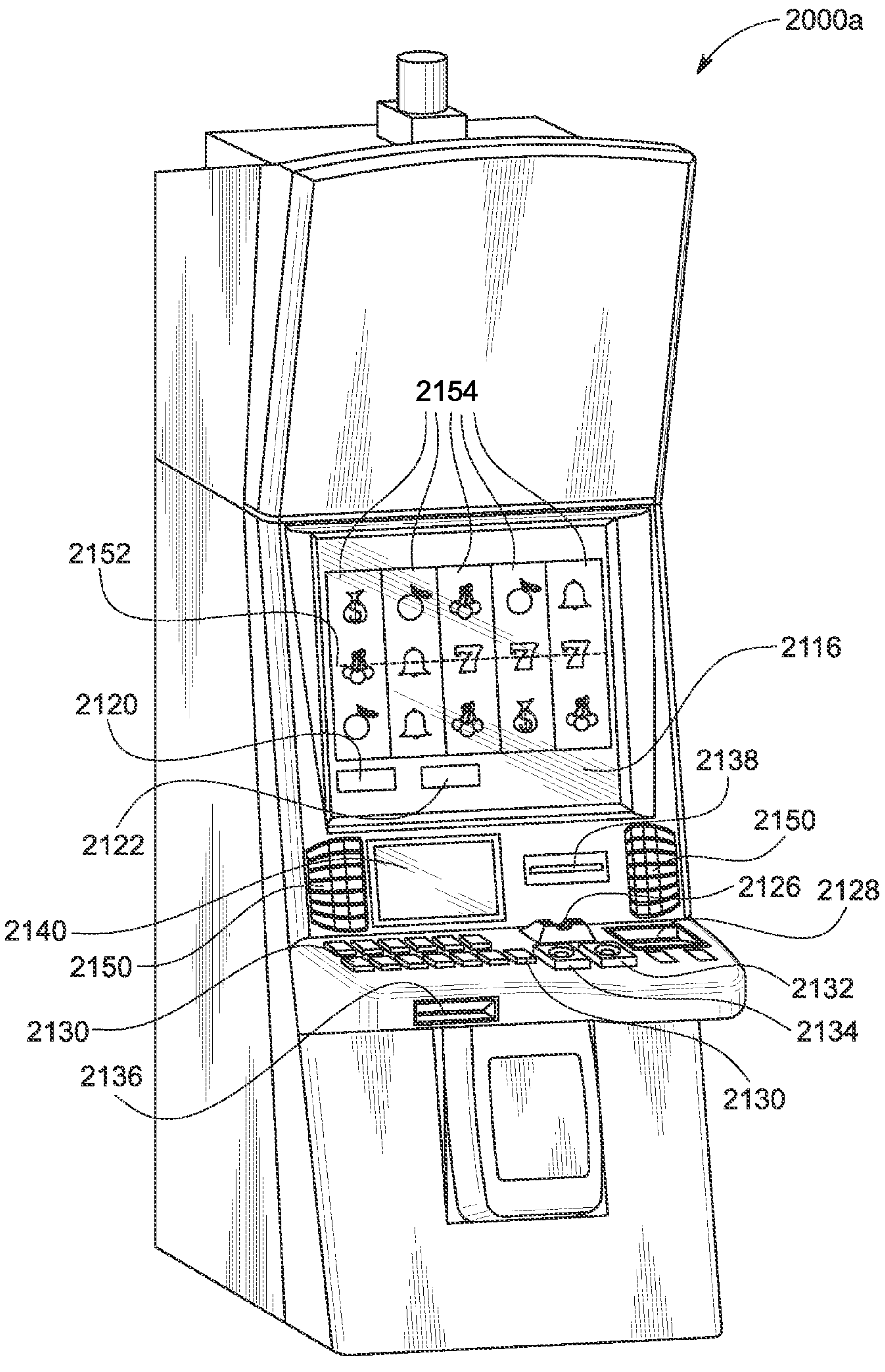
FIGS. 16A and 16B are perspective views of example alternative embodiments of the gaming system disclosed herein.
Figure 16B:
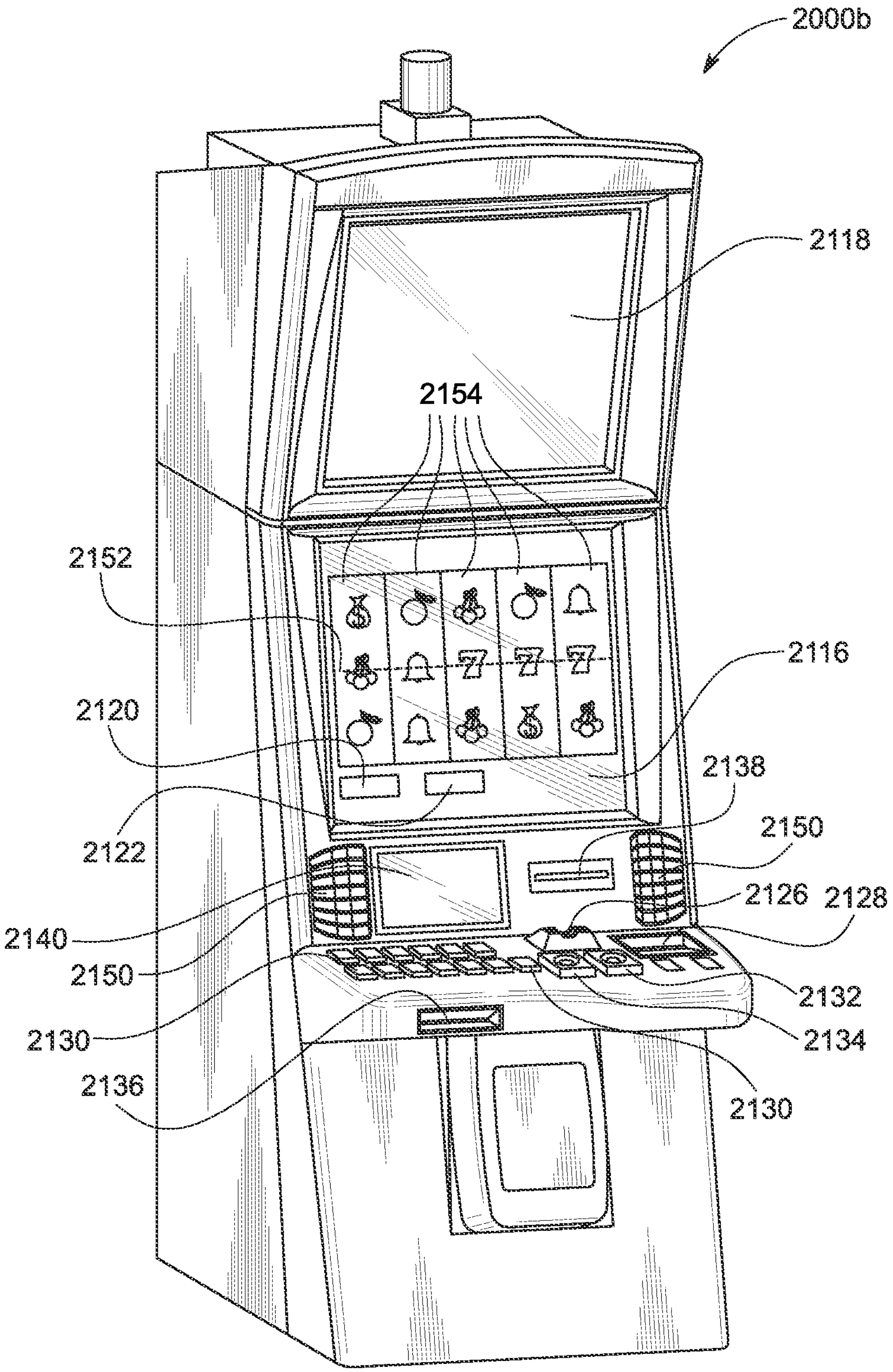
Figure 16C:
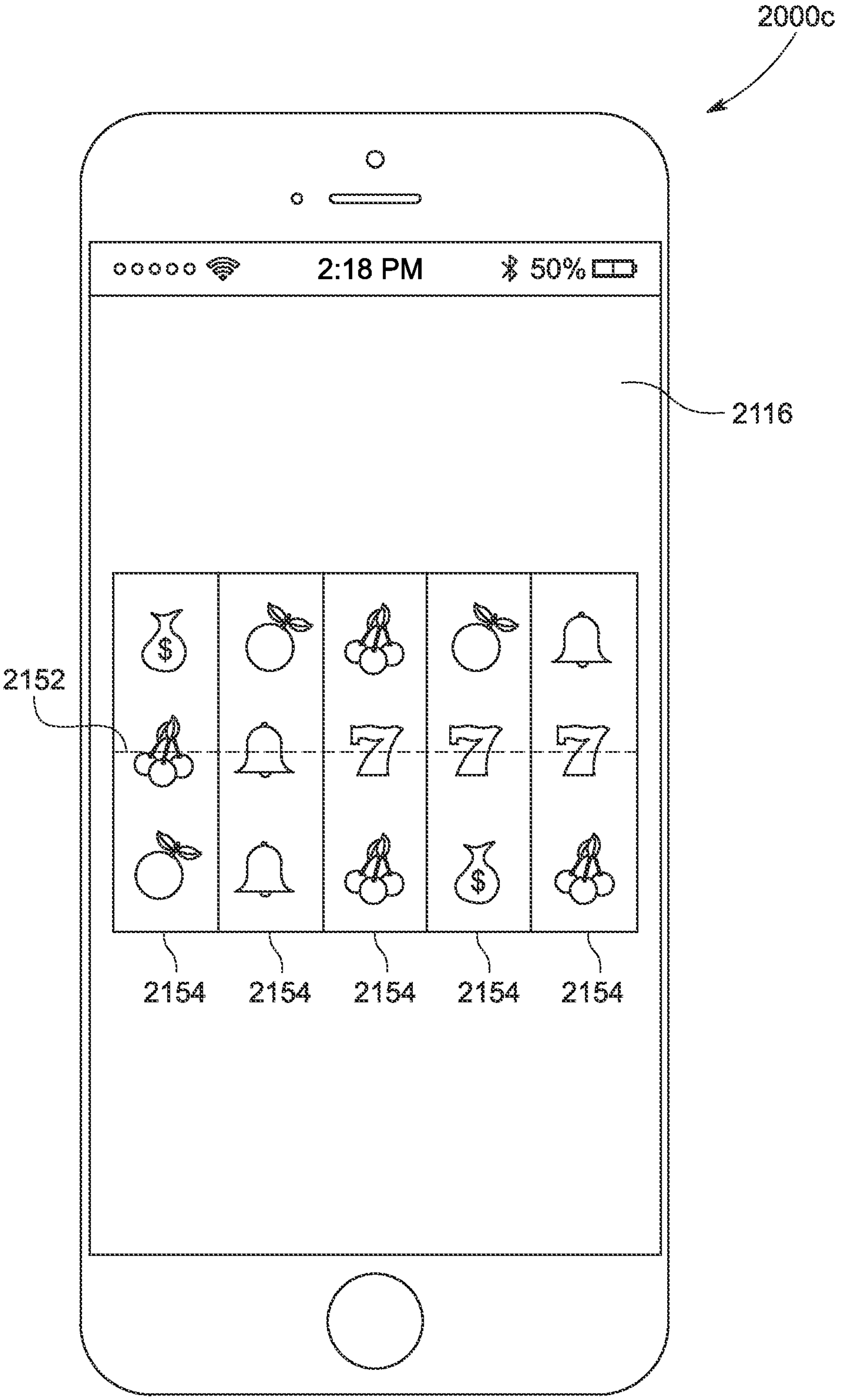
FIG. 16C is a front view of an example personal gaming device of the gaming system disclosed herein.

FIG. 15 is a block diagram of an example EGM 1000 and FIGS. 16A and 16B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 16C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 16A includes a central display device 2116, a player tracking display 2140, a credit display 2120, and a bet display 2122. The example EGM 2000*b* illustrated in FIG. 16B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 16A and 16B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 16A and 16B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 16A and 16B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 16A and 16B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 16A and 16B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 16A and 16B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments including a player tracking system, as further described below, the at least one input device 1030 includes a card reader in communication with the at least one processor of the EGM. The example EGMs 2000*a* and 2000*b* illustrated in FIGS. 16A and 16B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 16A and 16B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 16A and 16B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the gaming system includes a real-time or online accounting and gaming information system configured to communicate with the server. In this embodiment, the accounting and gaming information system includes: (a) a player database configured to store player profiles, (b) a player tracking module configured to track players (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 16B includes a payline 2152 and a plurality of reels 2154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a “BONUS” symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, which is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments' entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game, or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area.

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness, and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored, or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume, and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a," "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A gaming system customization marketplace system comprising:

a communication system;

a processor; and a memory device that stores a plurality of instructions, which when executed by the processor, cause the processor to:

receive, from a first system, a customization that is applicable to a wagering game, wherein the wagering game comprises a plurality of different sequential presentation states and wherein the customization:

comprises an additional presentation state configured to be added to the presentation states of the wagering game, does not change any awards resulting from any play of the wagering game, and does not change any probabilities of obtaining any awards from any play of the wagering game;

store the customization;

cause a display, by a display device, of an indication of the customization; and send the customization to a gaming system that is different than the first system such that the customization can be applied to a play of the wagering game displayed by the gaming system and such that the gaming system can display a play of the wagering game comprising the presentation states of the wagering game and the additional state of the customization.

2. The gaming system customization marketplace system of claim 1, wherein the first system comprises a customization creation system.

3. The gaming system customization marketplace system of claim 1, wherein the first system comprises a customization storage system.

4. The gaming system customization marketplace system of claim 1, wherein the plurality of instructions, when executed by the processor, cause the processor to cause a display, by the display device, of customization data in association with the display of the indication of the customization.

5. The gaming system customization marketplace system of claim 4, wherein customization data comprises an indication of popularity of the customization.

6. The gaming system customization marketplace system of claim 1, wherein the plurality of instructions, when executed by the processor, cause the processor to cause a display, by the display device, of an indication of a purchase price for the customization in association with the display of the indication of the customization.

7. The gaming system customization marketplace system of claim 1, wherein the plurality of instructions, when executed by the processor, cause the processor to cause a display, by the display device, of any images of the customization.

8. The gaming system customization marketplace system of claim 1, wherein the plurality of instructions, when executed by the processor, cause the processor to cause a display, by the display device, of an example play of the wagering game comprising the customization.

9. A gaming system customization marketplace system comprising:

a communication system;

a processor; and a memory device that stores a plurality of instructions, which when executed by the processor, cause the processor to:

cause a display, by a display device, of indications of different customizations for a wagering game, wherein each of the customizations:

comprises an additional presentation state configured to be added to presentations states of the wagering game, does not change any awards resulting from any play of the wagering game, and does not change any probabilities of obtaining any awards from any play of the wagering game;

receive a request for one of the customizations; and send the requested customization to a gaming system such that the customization can be applied to a play of the wagering game displayed by the gaming system and such that the gaming system can display of the wagering game comprising the presentation states and the additional state of the customization.

10. The gaming system customization marketplace system of claim 9, which is configured to receive the customizations from a plurality of different customization creation systems.

11. The gaming system customization marketplace system of claim 9, wherein the plurality of instructions, when executed by the processor, cause the processor to cause a display, by the display device, of customization data in association with the display of each of the indications of the customizations.

12. The gaming system customization marketplace system of claim 11, wherein the customization data comprises for each customization an indication of popularity of the customization.

13. The gaming system customization marketplace system of claim 11, wherein the customization data comprises for each customization an indication of a purchase price for the customization.

14. The gaming system customization marketplace system of claim 11, wherein the customization data comprises for each customization an indication of a quantity of games played that employed the customization.

15. The gaming system customization marketplace system of claim 11, wherein the customization data comprises for each customization an indication of a quantity of players that have purchased the customization.

16. The gaming system customization marketplace system of claim 9, wherein the plurality of instructions, when executed by the processor, cause the processor to cause a display, by the display device, of for each customization any images of the customization.

17. A gaming system customization marketplace system comprising:

a communication system;

a processor; and a memory device that stores a plurality of instructions, which when executed by the processor, cause the processor to:

cause a display, by a display device, for each of a plurality of different wagering games, indications of different customizations associated with the wagering game, wherein for each wagering game each customization associated with the wagering game:

comprises an additional presentation state configured to be added to presentations states of the wagering game, does not change any awards resulting from any play of the wagering game, and does not change any probabilities of obtaining any awards from any play of the wagering game;

receive a request for one of the customizations; and send the requested customization to a gaming system such that the customization can be applied to the wagering game associated with the customization and such that the gaming system can display a play of the wagering game comprising the presentation states of the wagering and the additional state of the customization.

18. The gaming system customization marketplace system of claim 17, which is configured to receive the customizations from a plurality of different gaming systems.

19. The gaming system customization marketplace system of claim 17, wherein the plurality of instructions, when executed by the processor, cause the processor to cause a display, by the display device, of customization data in association with the display of each of the indications of the customizations, wherein customization data comprises for each customization an indication of popularity of the customization.

20. The gaming system customization marketplace system of claim 17, wherein the plurality of instructions, when executed by the processor, cause the processor to cause a display, by the display device, of customization data in association with the display of each of the indications of the customizations, wherein customization data comprises for each customization an indication of a purchase price for the customization.

* * * * *